United States Patent
Takano

(10) Patent No.: US 11,330,269 B2
(45) Date of Patent: May 10, 2022

(54) MOVING IMAGE CODING DEVICE, MOVING IMAGE CODING METHOD AND MOVING IMAGE CODING PROGRAM

(71) Applicant: NEC Corporation, Tokyo (JP)

(72) Inventor: Fumiyo Takano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 98 days.

(21) Appl. No.: 16/651,453

(22) PCT Filed: Aug. 6, 2018

(86) PCT No.: PCT/JP2018/029429
§ 371 (c)(1),
(2) Date: Mar. 27, 2020

(87) PCT Pub. No.: WO2019/064934
PCT Pub. Date: Apr. 4, 2019

(65) Prior Publication Data
US 2020/0304800 A1    Sep. 24, 2020

(30) Foreign Application Priority Data
Sep. 27, 2017  (JP) .............................. JP2017-185990

(51) Int. Cl.
*H04N 19/13*    (2014.01)
*H04N 19/137*    (2014.01)
(Continued)

(52) U.S. Cl.
CPC ......... *H04N 19/137* (2014.11); *H04N 19/105* (2014.11); *H04N 19/176* (2014.11); *H04N 19/52* (2014.11)

(58) Field of Classification Search
CPC .. H04N 19/137; H04N 19/105; H04N 19/147; H04N 19/176; H04N 19/436
See application file for complete search history.

(56) References Cited

U.S. PATENT DOCUMENTS

2008/0267292 A1* 10/2008 Ito .................... H04N 19/52
                                                    375/240.16
2012/0114041 A1* 5/2012 Sakamoto ........... H04N 19/136
                                                    375/240.16
(Continued)

FOREIGN PATENT DOCUMENTS

JP    2012-175424 A    9/2012
JP    2013-042385 A    2/2013
(Continued)

OTHER PUBLICATIONS

ITU-T Recommendation H.265 "High efficiency video coding," Apr. 2013.
(Continued)

*Primary Examiner* — Kathleen V Nguyen
(74) *Attorney, Agent, or Firm* — Sughrue Mion, PLLC

(57) ABSTRACT

A moving image coding device 10 includes: a cost determination unit 12 that determines, as a cost relating to a block to be coded, a minimum cost among appraisal costs relating to determined candidates for a motion vector; a storage unit 13 that stores, as coding information relating to the block to be coded, a candidate for the motion vector corresponding to the determined cost; and an update unit 14 that updates, to coding information relating to the block to be coded, the cost of which is smaller than the sum total of costs relating to blocks included in the block to be coded, the coding information relating to the included blocks and stored in the storage unit 13.

16 Claims, 22 Drawing Sheets

(51) Int. Cl.
    *H04N 19/105*     (2014.01)
    *H04N 19/176*     (2014.01)
    *H04N 19/52*     (2014.01)

(56) References Cited

U.S. PATENT DOCUMENTS

| | | |
|---|---|---|
| 2013/0251044 A1 | 9/2013 | Lim et al. |
| 2014/0341284 A1 | 11/2014 | Kim et al. |
| 2017/0339426 A1* | 11/2017 | Lee .................. H04N 19/176 |
| 2018/0227592 A1 | 8/2018 | Takano |

FOREIGN PATENT DOCUMENTS

| | | |
|---|---|---|
| JP | 2013-121167 A | 6/2013 |
| JP | 2014-502481 A | 1/2014 |
| JP | 2014-533059 A | 12/2014 |
| WO | 2017/010073 A1 | 1/2017 |

OTHER PUBLICATIONS

Cheung, Nagai-Man, et al. "Video coding on multicore graphics processors" Signal Processing Magazine, IEEE 27.2 (2010): 79-89.
Fumiyo Takano, et al., "Parallel Merge Mode Estimation for HEVC on GPU", The Proceedings of the 31st Picture Coding Symposium of Japan, The Proceedings of the 21st Image Media Processing Symposium, Nov. 16, 2016, pp. 214-215.
Fumiyo Takano, et al., "4K-UHD Real-Time HEVC Encoder With GPU Accelerated Motion Estimation", IEEE International Conference on Image Processing (ICIP), Sep. 20, 2017, pp. 2731-2735.
International Search Report for PCT Application No. PCT/JP2018/029429, dated Sep. 18, 2018.

* cited by examiner

FIG. 23
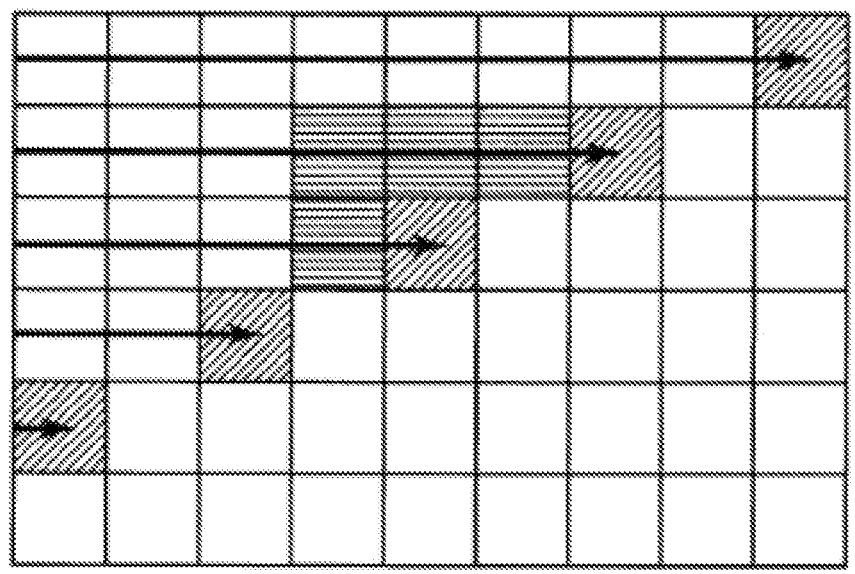
 : REFERENCE BLOCK
 : BLOCK TO BE CODED
 : DIRECTION OF PROCESSING

MOVING IMAGE CODING DEVICE, MOVING IMAGE CODING METHOD AND MOVING IMAGE CODING PROGRAM

This application is a National Stage Entry of PCT/JP2018/029429 filed on Aug. 6, 2018, which claims priority from Japanese Patent Application 2017-185990 filed on Sep. 27, 2017, the contents of all of which are incorporated herein by reference, in their entirety.

TECHNICAL FIELD

The present invention relates to a moving image coding device, a moving image coding method, and a moving image coding program. In particular, the present invention relates to a moving image coding device, a moving image coding method, and a moving image coding program that operate with a high parallel processing efficiency without a reduction in coding efficiency.

BACKGROUND ART

There is an increasing demand for improving resolution of moving images. The demand has also triggered an advancement of coding technologies. Examples of coding technologies include, in chronological order of development, MPEG-2, H.264/MPEG-4 AVC (hereinafter referred to as H.264), and H.265/HEVC (hereinafter referred to as H.265). As compared with previously developed coding technologies, newly developed coding technologies provide an improved compression efficiency. Coding schemes used in the coding technologies described above compress information with a higher coding efficiency by using between-frame motion-compensated prediction.

Non Patent Literature (NPL) 1 describes details of processing based on the H.265 standard. In moving image coding processing based on the H.265 standard, an image (picture) is divided into blocks called coding tree units (CTUs), and the divided CTUs are processed in order of raster scan (the CTUs arranged in a frame are processed in order from upper left to smaller right). A maximum size of a CTU is 64×64 pixels.

A CTU is further divided into blocks called coding units (CUs) using quadtree segmentation. In the moving image coding processing compliant with the H.265 standard, coding processing is performed for each CU.

Furthermore, a CTU includes coding tree blocks (CTBs) of luma signal and chroma signal. Furthermore, a CU includes coding blocks (CBs) of luma signal and chroma signal.

Motion-compensated prediction for compressing information between frames is a technology for compressing moving image information by the following method. In motion-compensated prediction, motion information between a frame to be coded and a coded reference frame is used to correct an image of the reference frame. Next, only information on difference between the corrected image (prediction image) and a current image of the frame to be coded and information representing between-frame motion are coded. The between-frame motion is expressed by a motion vector representing the amount of movement.

In moving image coding, it is important that predictive coding information such as motion information is determined so that the amount of noise generated in a decoded image is suppressed and the amount of information to be coded is minimized. In general moving image coding methods, a technique called R-D optimization in which predictive coding information is determined so as to satisfy the conditions described above is widely used.

In R-D optimization, a rate distortion cost represented by $J=D+\lambda R$ is computed for each of many motion vector candidates. D is the amount of distortion generated in a difference image, R is a code quantity generated by coding motion information, and $\lambda$ is a weight coefficient that depends on a complexity of the image and the like. A motion vector candidate corresponding to the minimum rate distortion cost among the computed rate distortion costs is employed as a motion vector.

In a moving image, a correlation between pieces of motion information of blocks located spatially nearby (neighboring blocks) or a correlation between pieces of motion information of blocks located temporally nearby is higher than a correlation between pieces of motion information of general blocks. H.265 uses adaptive motion vector prediction (AMVP) in which a motion vector prediction value (prediction vector) is adaptively selected from motion vectors of neighboring blocks, or a merge mode in which motion information is copied from motion information of a neighboring block. Using AMVP or the merge mode reduces the code quantity R generated by coding motion information.

Spatial neighboring blocks, which are neighboring blocks located spatially near a block to be coded, are shown in FIG. 19. FIG. 19 is an explanatory diagram showing the spatial neighboring blocks of the block to be coded.

Specifically, the spatial neighboring blocks are blocks A, B, C, D, and E shown in FIG. 19. Furthermore, the neighboring blocks also include temporal neighboring blocks that belong to temporal neighboring frames of a frame to which the block to be coded belongs and are located at the same position as the block to be coded.

In the merge mode, only an index of a list of motion information of neighboring blocks is coded, and the coded index is transmitted. An encoder can optionally select, from a list of neighboring blocks, a block to be used in the merge mode or AMVP. Motion information of neighboring blocks obtained by an encoder is the same as information obtained by a decoder. That is, in the merge mode, transmission of coded indexes corresponds to transmission of motion information. In the merge mode, the code quantity generated by coding motion information is further reduced.

As described in NPL 1, in order to reduce the code quantity generated by coding motion information, an index in the merge mode is set not in accordance with information fixed on the basis of the position of the block but in accordance with a coding mode of a neighboring block. The merge mode is a technology that has a great effect on reduction of the code quantity. In order to achieve a higher coding efficiency, it is important that the merge mode is used appropriately.

FIG. 20 is a block diagram showing a configuration example of a general moving image coding device. A moving image coding device 1000 shown in FIG. 20 includes a transform/quantization unit 1100, a subtraction unit 1200, a coding unit 1300, an inverse transform/inverse quantization unit 1400, an addition unit 1210, a loop filter 1500, a frame buffer 1600, a predictive coding information determination unit 1700, an intra prediction unit 1800, and a motion-compensated prediction unit 1900.

The subtraction unit 1200 subtracts, from externally input image signals, a prediction image input from the intra prediction unit 1800 or the motion-compensated prediction unit 1900. The subtraction unit 1200 sets an image obtained by subtracting the prediction image as a difference image, and inputs the difference image to the transform/quantization unit 1100.

The transform/quantization unit 1100 orthogonally transforms the input difference image to generate a transform coefficient, and quantizes the generated transform coefficient. The transform/quantization unit 1100 inputs the quantized transform coefficient to the coding unit 1300.

The coding unit 1300 performs lossless coding such as variable-length coding or arithmetic coding on the quantized transform coefficient that has been input, to generate a bitstream. The generated bitstream is output from the moving image coding device 1000.

Furthermore, the quantized transform coefficient is input to the inverse transform/inverse quantization unit 1400. The inverse transform/inverse quantization unit 1400 inverse quantizes the quantized transform coefficient that has been input to generate a transform coefficient, and inverse orthogonally transforms the generated transform coefficient. The inverse transform/inverse quantization unit 1400 inputs the inverse orthogonally transformed information to the addition unit 1210.

The addition unit 1210 adds the inverse orthogonally transformed information and the prediction image to generate a reconstructed image. The addition unit 1210 inputs the generated reconstructed image to the loop filter 1500.

The loop filter 1500 removes block distortion from the input reconstructed image. The loop filter 1500 stores, in the frame buffer 1600, the reconstructed image from which the block distortion has been removed. The reconstructed image stored in the frame buffer 1600 is used as a reference image for other frames.

The predictive coding information determination unit 1700 uses the input image, the reconstructed image, and a reference image of another frame to determine which prediction mode to use to predict an input image, an intra prediction mode or a motion-compensated prediction mode. Furthermore, the predictive coding information determination unit 1700 determines predictive coding information for the determined prediction mode.

The intra prediction unit 1800 receives an input of the reconstructed image from which the block distortion has not yet been removed. The intra prediction unit 1800 performs intra prediction processing on the input reconstructed image, and outputs an intra prediction image generated by the intra prediction processing.

The motion-compensated prediction unit 1900 detects a change in position of an image block of the input image corresponding to an image block of the reconstructed image stored in the frame buffer 1600. Next, the motion-compensated prediction unit 1900 obtains a motion vector that corresponds to the detected change in position. Furthermore, the motion-compensated prediction unit 1900 uses the obtained motion vector to perform motion-compensated prediction processing, and outputs a motion-compensated prediction image generated by the motion-compensated prediction processing.

The intra prediction unit 1800 and the motion-compensated prediction unit 1900 each generate a prediction image in accordance with the determination made by the predictive coding information determination unit 1700.

Next, a configuration example of the predictive coding information determination unit 1700 that determines predictive coding information that includes motion information is shown in FIG. 21. FIG. 21 is a block diagram showing a configuration example of a general predictive coding information determination unit. The predictive coding information determination unit 1700 shown in FIG. 21 includes a motion vector search unit 1710, a merge vector/merge index determination unit 1720, an intra prediction mode determination unit 1730, a predictive coding mode determination unit 1740, and a prediction information buffer 1750.

The motion vector search unit 1710 has a function of performing block matching or the like to determine a provisional motion vector with the minimum cost among many motion vector candidates in a search range. Note that block matching is a method of searching for a motion vector with the minimum cost on a reference pixel by using a cost function such as a sum of absolute difference (SAD).

The merge vector/merge index determination unit 1720 has a function of performing block matching or the like to determine a merge vector with the minimum cost among a plurality of merge vector candidates derived from motion vectors of neighboring blocks. Furthermore, the merge vector/merge index determination unit 1720 has a function of determining a merge index corresponding to the determined merge vector with the minimum cost.

The intra prediction mode determination unit 1730 has a function of determining a mode with the minimum cost among a plurality of intra prediction modes.

The predictive coding mode determination unit 1740 receives an input of a provisional motion vector and a cost relating to the provisional motion vector output from the motion vector search unit 1710. Furthermore, the predictive coding mode determination unit 1740 receives an input of merge information and a cost relating to the merge information output from the merge vector/merge index determination unit 1720. Note that the merge information includes a merge vector and a merge index.

Furthermore, the predictive coding mode determination unit 1740 receives an input of intra mode information and a cost relating to the intra mode information output from the intra prediction mode determination unit 1730. The predictive coding mode determination unit 1740 determines, on the basis of the input information, which prediction mode to use as a predictive coding mode for the block to be coded; a prediction vector mode in which a provisional motion vector is used, the merge mode, or an intra prediction mode. Note that the prediction vector mode and the merge mode are included in the motion-compensated prediction mode.

The prediction information buffer 1750 has a function of holding determined predictive coding information such as motion information. The prediction information buffer 1750 receives an input of the determined predictive coding information from the predictive coding mode determination unit 1740.

Next, a configuration example of the merge vector/merge index determination unit 1720 is shown in FIG. 22. FIG. 22 is a block diagram showing a configuration example of a general merge vector/merge index determination unit. The merge vector/merge index determination unit 1720 shown in FIG. 22 includes a merge vector candidate list generation unit 1721 and a merge vector/index selection unit 1722.

The merge vector candidate list generation unit 1721 has a function of generating a list of motion vectors that are merge vector candidates, from motion vectors of neighboring blocks held in a motion information buffer (not shown).

The merge vector/index selection unit 1722 computes, on the basis of a current image and a reference image, an appraisal cost for each merge vector candidate included in the list generated by the merge vector candidate list generation unit 1721. The merge vector/index selection unit 1722 selects a merge vector with the minimum appraisal cost among the computed appraisal costs, and selects an index for the selected merge vector. The merge vector/index selection unit 1722 outputs merge information that includes the selected merge vector and merge index, and the appraisal cost relating to the selected merge vector.

Motion estimation processing, in which costs relating to many vectors are compared, involves a large amount of computation. That is, speeding up of the motion estimation processing is required. For example, speeding up of the processing is likely to be achieved by performing pieces of motion estimation processing in parallel using a many-core processor such as a graphic processing unit (GPU) having many processor cores.

Furthermore, one of the general parallel processing techniques in moving image coding technologies is wavefront parallel processing (WPP). A specific example of WPP is described in NPL 2.

FIG. 23 is an explanatory diagram showing an example of WPP. As shown in FIG. 23, when a moving image coding device encodes rows of image blocks in parallel using WPP, a block to be coded in a certain row is positioned two blocks left from a block to be coded in a row immediately above the certain row. Thus, when encoding a block to be coded in a certain row, the moving image coding device can reference a processing result of a left block or an upper right block.

Furthermore, Patent Literature (PTL) 1 describes a coding processor that divides an image into a plurality of regions, and encodes blocks that are adjacent to a boundary of a region by using only the information of the blocks in the region to which the blocks that are adjacent to the boundary belong, thereby performing coding processing on the regions in parallel.

Furthermore, the H.265 standard described in NPL 1 employs a function called parallel merge that improves parallelism of coding processing. When parallel merge is used, a CTU is divided into a plurality of square regions called motion estimation regions (MERs).

In parallel merge, when a block that belongs to an MER is coded, motion information of blocks that belong to the same MER is excluded from being referenced. That is, since there are no dependencies among the blocks, the blocks are processed in parallel. Thus, when the specified size of MERs is 16×16, a coding device can encode in parallel, for example, 4 blocks of 8×8 in size or 16 blocks of 4×4 in size that belong to the same MER.

Furthermore, PTLs 2 and 3 describe a technology in which, when a block that belongs to a CU is coded, reference to other blocks that belong to the same CU is prohibited so that blocks that belong to the same CU can be processed in parallel.

CITATION LIST

Patent Literature

PTL 1: Japanese Patent Application Laid-Open No. 2012-175424
PTL 2: Japanese Patent Application Laid-Open No. 2013-121167
PTL 3: Japanese Unexamined Patent Application Publication No. 2014-533059

Non Patent Literature

NPL 1: ITU-T Recommendation H.265 "High efficiency video coding," April 2013.

NPL 2: Cheung, Nagai-Man, et al. "Video coding on multicore graphics processors." Signal Processing Magazine, IEEE 27.2 (2010): 79-89.

SUMMARY OF INVENTION

Technical Problem

To allow every one of a plurality of processor cores to run fully in parallel processing, it is important to prepare many tasks that can be processed in parallel.

The tasks described above correspond to coding processing of each block in parallel processing such as WPP and the technology described in PTLs 2 and 3. Furthermore, in the parallel processing performed by the coding processor described in PTL 1, the tasks described above correspond to coding processing of divided regions.

To allow all of the plurality of processor cores to run at the same time, tasks of at least the same number as the processor cores are required. Furthermore, in a case where the amount of processing varies from task to task, the amounts of processing performed by the processors tend to be equalized more as the number of tasks increases.

The reason is that, for example, in a case where the number of tasks does not exceed the number of processor cores, the amount of processing performed by each processor is equal to the amount of processing for the allocated task. However, in a case where the number of tasks exceeds the number of processor cores, a coding device can allocate, to each processor core, a combination of tasks, the tasks being combined in accordance with the processing amounts, for example, a combination of a task that involves a larger amount of processing and a task that involves a smaller amount of processing, or a combination of tasks that involve substantially the same amount of processing.

That is, in a case where parallel processing is performed by a many-core processor having thousands or more of processor cores such as a GPU, it is required to prepare many tasks that can be processed in parallel.

As described above, motion estimation processing uses spatial data dependencies among blocks, because motion information is compressed on the basis of a spatial correlation. Thus, motion estimation processing has difficulty in performing coding processing of many blocks, that is, in processing many tasks in parallel.

Even in WPP, the number of tasks that are processed in parallel is at most the number of rows of blocks. Even in a case where an image with a resolution of 4K (3840×2160) is coded, the maximum number of tasks is 34 (>33.75=2160/64).

In a case where parallel merge is used, the maximum size of an MER is 64×64, which is the same as the maximum size of a CTU. Furthermore, the minimum block size in a CTU is 4×4. Thus, even in a case where parallel merge is used, the maximum number of tasks that can be processed in parallel is (64×64)/(4×4)=256. That is, the number of tasks is insufficient to allow a many-core processor capable of processing thousands of tasks in parallel to run fully.

Furthermore, the maximum number of PUs in a CU is four. That is, even in a case where the technology described in PTLs 2 and 3 is used, the number of tasks that can be processed in parallel is at most four, and the number of tasks is insufficient to allow the many-core processor to run fully.

It is expected that enabling parallel processing of many tasks may allow the many-core processor to perform coding processing at high speed.

Furthermore, the coding processor described in PTL 1 has a problem in that, when an image is divided into many regions (that is, when the number of tasks that can be processed in parallel increases), the number of blocks to which the merge mode is not applied increases, and the coding efficiency reduces.

As described above, in order to achieve a higher coding efficiency, it is important that the merge mode is used appropriately. PTLs 1 to 3 and NPLs 1 and 2 fail to describe a method for increasing the number of tasks that can be processed in parallel in the merge mode.

A method for increasing the number of tasks that can be processed in parallel in the merge mode will be considered. As described above, the merge vector candidate list generation unit 1721 generates, from motion vectors of neighboring blocks, a list of motion vectors that are merge vector candidates. When generating the list, the merge vector candidate list generation unit 1721 references both blocks in a certain region to which a block to be coded belongs and blocks outside the certain region.

When the blocks outside the certain region are referenced, it is required that predictive coding information determination processing for a frame to which the blocks outside the certain region belong has been completed. That is, since there are dependencies among pieces of predictive coding information determination processing relating to the corresponding frames, the pieces of processing are not performed in parallel. This is why it is difficult to increase the number of tasks that can be processed in parallel.

It is therefore an object of the present invention to provide a moving image coding device, a moving image coding method, and a moving image coding program that can solve the above-described problems and enable parallel processing of many tasks without a reduction in coding efficiency.

Solution to Problem

A moving image coding device according to the present invention includes: a motion vector candidate determination unit which determines, on the basis of a motion vector of an adjacent block, among adjacent blocks that are adjacent to a block to be coded included in a reference region in an image, included in the reference region, candidates for a motion vector of the block to be coded to be used for motion-compensated prediction; a cost determination unit which determines, as a cost relating to a block to be coded, a minimum cost among appraisal costs relating to determined candidates for a motion vector; a storage unit which stores, as coding information relating to the block to be coded, a candidate for the motion vector corresponding to the determined cost; and an update unit which updates, to coding information relating to the block to be coded, the cost of which is smaller than the sum total of costs relating to blocks included in the block to be coded, the coding information relating to the included blocks and stored in the storage unit.

A moving image coding method according to the present invention includes: determining, on the basis of a motion vector of an adjacent block, among adjacent blocks that are adjacent to a block to be coded included in a reference region in an image, included in the reference region, candidates for a motion vector of the block to be coded to be used for motion-compensated prediction; determining, as a cost relating to a block to be coded, a minimum cost among appraisal costs relating to determined candidates for a motion vector; storing, as coding information relating to the block to be coded, a candidate for the motion vector corresponding to the determined cost; and updating, to coding information relating to the block to be coded, the cost of which is smaller than the sum total of costs relating to blocks included in the block to be coded, stored coding information relating to the included blocks.

A moving image coding program according to the present invention causes a computer to perform: a first determination processing of determining, on the basis of a motion vector of an adjacent block, among adjacent blocks that are adjacent to a block to be coded included in a reference region in an image, included in the reference region, candidates for a motion vector of the block to be coded to be used for motion-compensated prediction; a second determination processing of determining, as a cost relating to a block to be coded, a minimum cost among appraisal costs relating to determined candidates for a motion vector; a storage processing of storing, as coding information relating to the block to be coded, a candidate for the motion vector corresponding to the determined cost; and an update processing of updating, to coding information relating to the block to be coded, the cost of which is smaller than the sum total of costs relating to blocks included in the block to be coded, stored coding information relating to the included blocks.

Advantageous Effects of Invention

According to the present invention, many tasks can be processed in parallel without a reduction in coding efficiency.

BRIEF DESCRIPTION OF DRAWINGS

FIG. 23 is an explanatory diagram showing an example of WPP.

DESCRIPTION OF EMBODIMENTS

First Exemplary Embodiment

Description of Configuration

Figure 1:
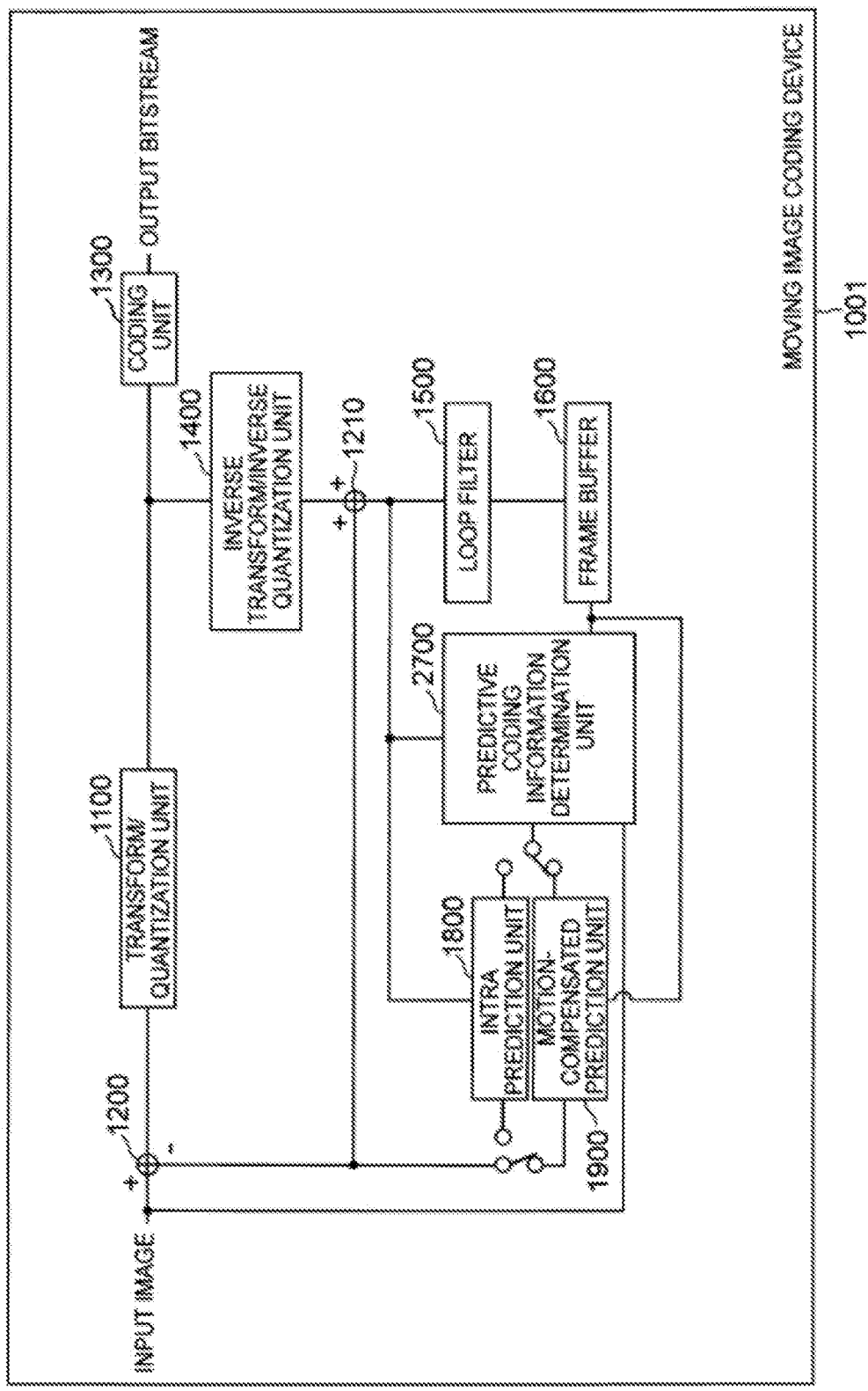
FIG. 1 is a block diagram showing a configuration example in a first exemplary embodiment of a moving image coding device according to the present invention.

Exemplary embodiments of the present invention will be described below with reference to the drawings. FIG. 1 is a block diagram showing a configuration example in a first exemplary embodiment of a moving image coding device according to the present invention.

Figure 20:
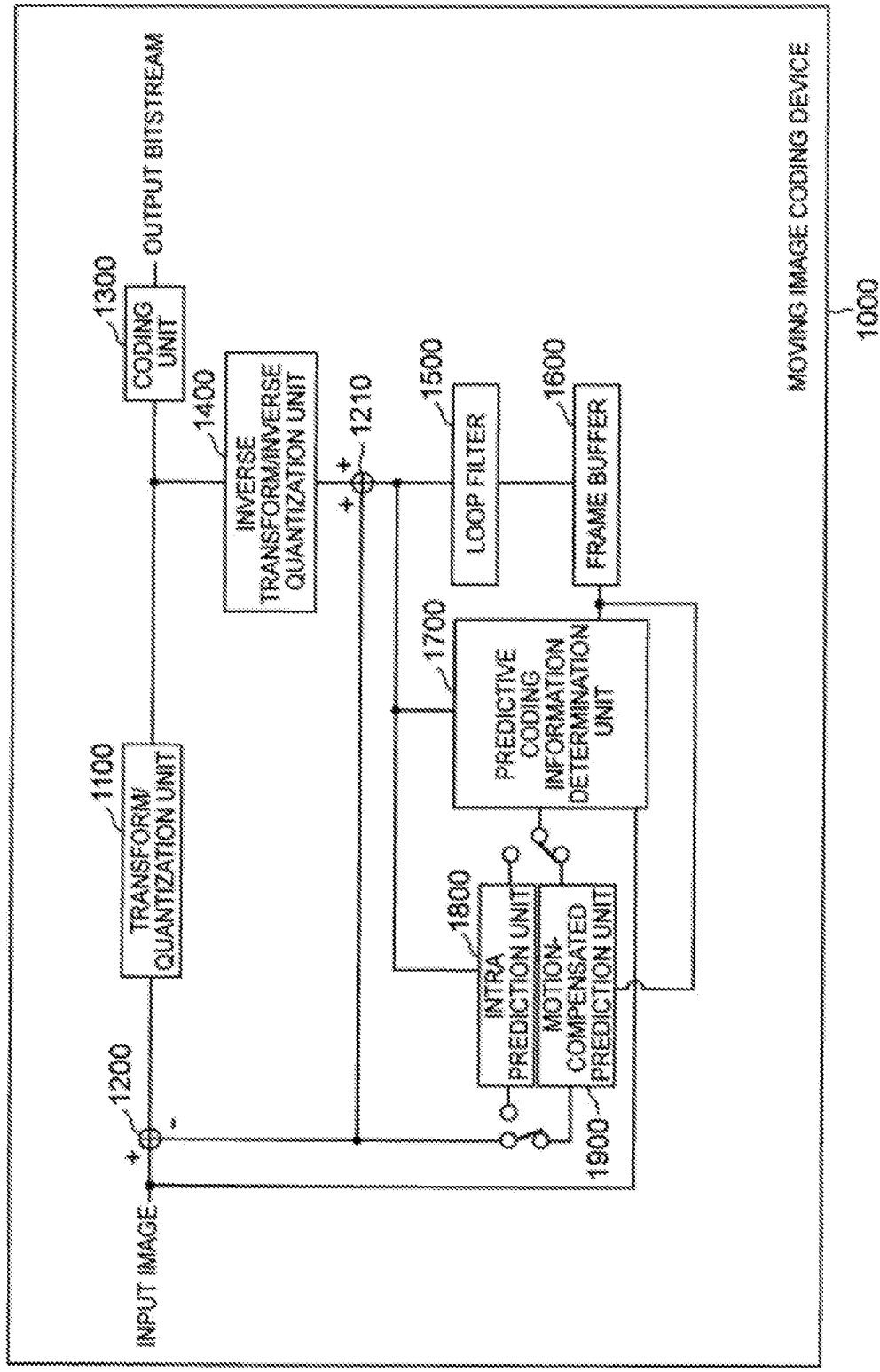
FIG. 20 is a block diagram showing a configuration example of a general moving image coding device.
Figure 21:
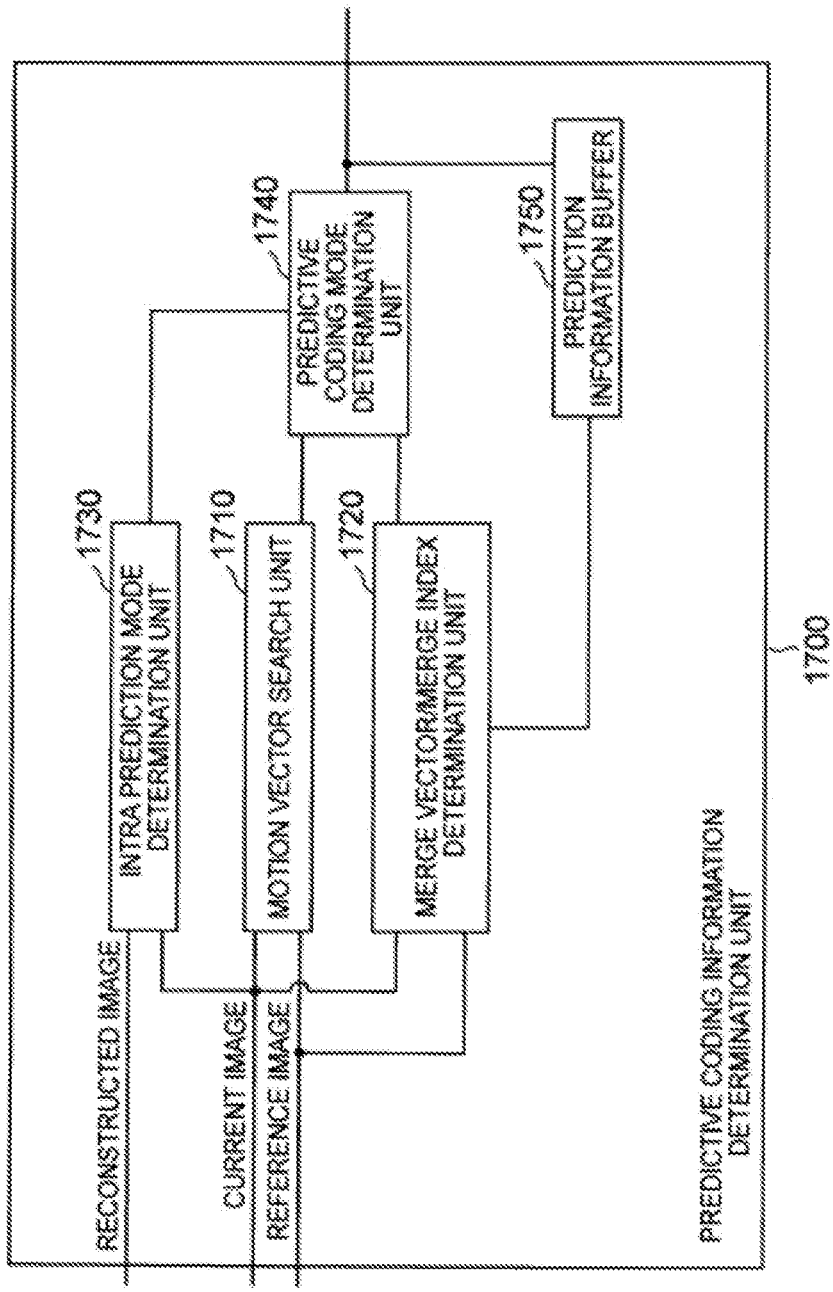
FIG. 21 is a block diagram showing a configuration example of a general predictive coding information determination unit.
Figure 22:
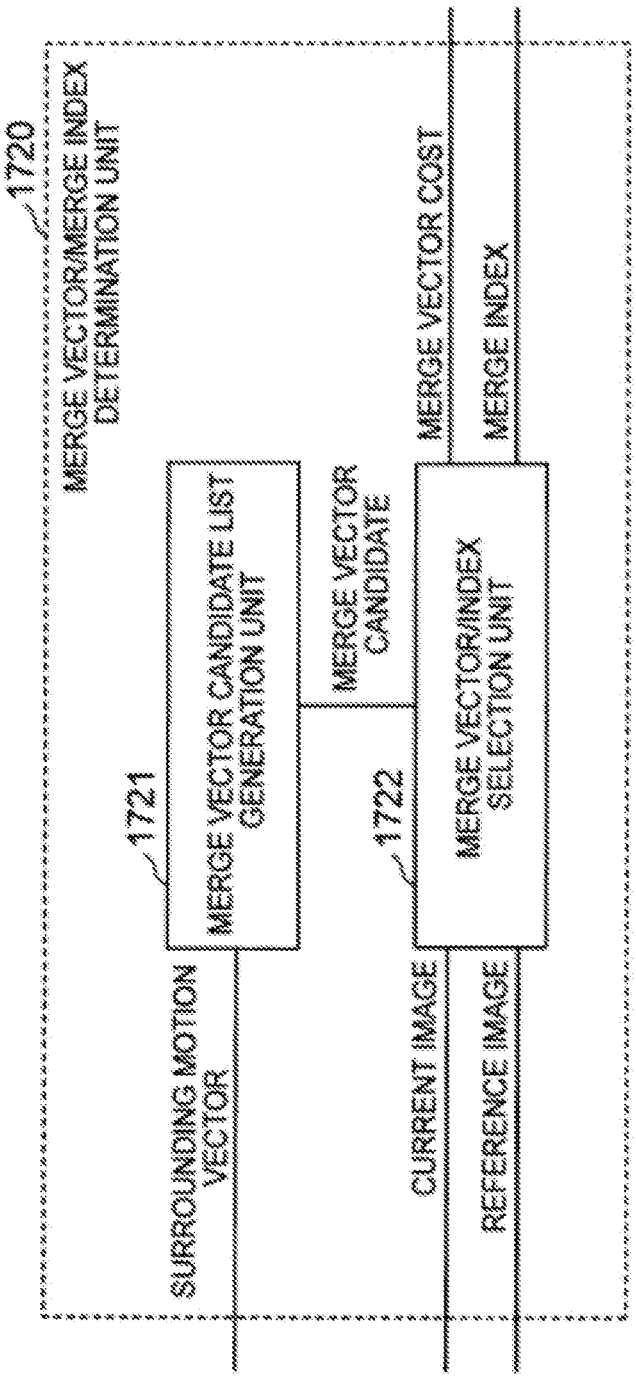
FIG. 22 is a block diagram showing a configuration example of a general merge vector/merge index determination unit.

As shown in FIG. 1, a moving image coding device 1001 of the present exemplary embodiment is different from the moving image coding device 1000 shown in FIG. 20 in that a predictive coding information determination unit 2700 is included instead of the predictive coding information determination unit 1700. A configuration of the moving image coding device 1001 shown in FIG. 1 other than the predictive coding information determination unit 2700 is similar to a configuration of the moving image coding device 1000 shown in FIG. 20.

When the predictive coding information determination unit 2700 of the present exemplary embodiment generates a merge vector candidate list, blocks outside a specific region in a frame to which a block to be coded belongs are not referenced.

The specific region in the present exemplary embodiment is a CTB that includes the block to be coded. That is, when generating a merge vector candidate list, the predictive coding information determination unit 2700 does not reference blocks that do not belong to the CTB to which the block to be coded belongs. Note that the specific region may be a region other than a CTB.

Figure 2:
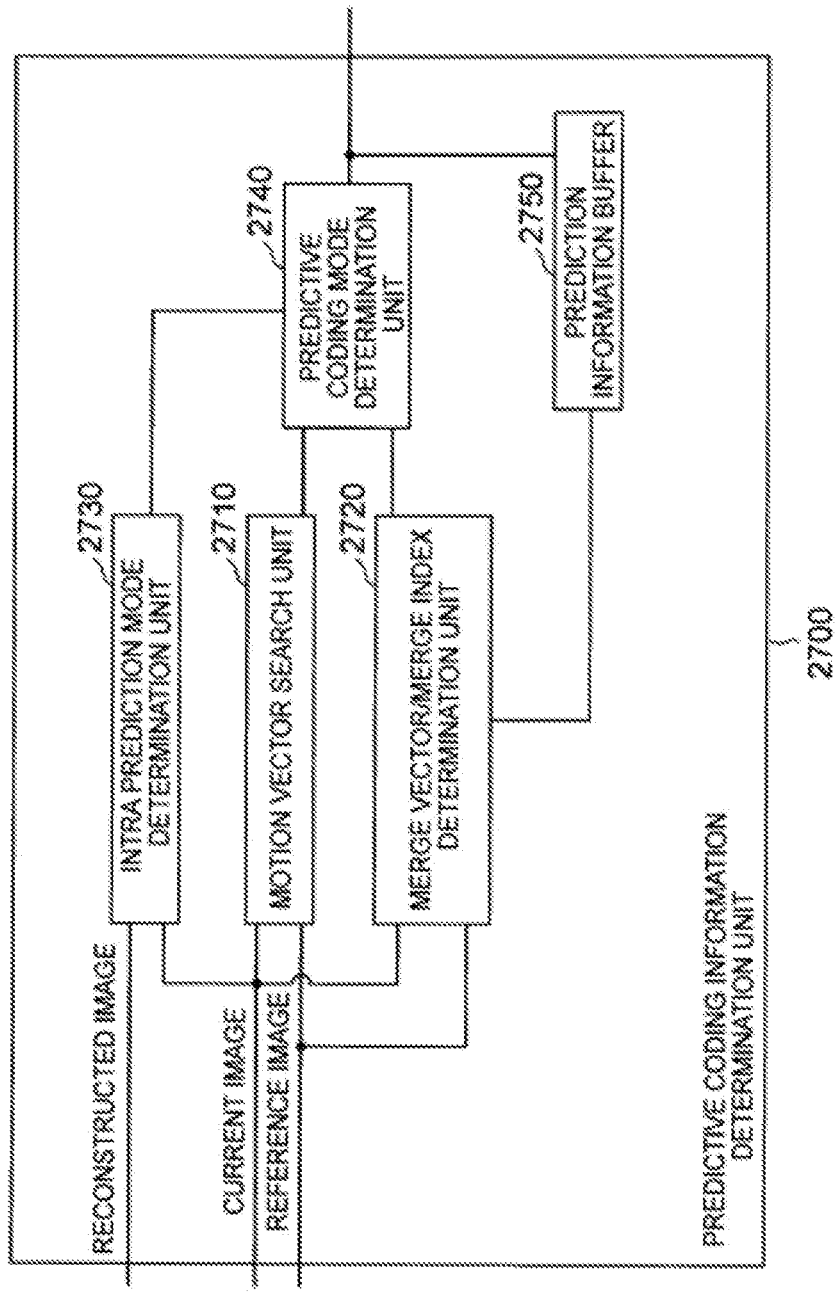
FIG. 2 is a block diagram showing a configuration example in the first exemplary embodiment of a predictive coding information determination unit 2700.

A configuration of the predictive coding information determination unit 2700 of the present exemplary embodiment will be described with reference to the drawings. FIG. 2 is a block diagram showing a configuration example in the first exemplary embodiment of the predictive coding information determination unit 2700.

The predictive coding information determination unit 2700 shown in FIG. 2 includes a motion vector search unit 2710, a merge vector/merge index determination unit 2720, an intra prediction mode determination unit 2730, a predictive coding mode determination unit 2740, and a prediction information buffer 2750.

The motion vector search unit 2710 has a function of performing block matching or the like to determine a provisional motion vector with the minimum cost among many motion vector candidates in a search range.

The merge vector/merge index determination unit 2720 has a function of performing block matching or the like to determine a merge vector with the minimum cost among a plurality of merge vector candidates derived from motion vectors of neighboring blocks. Furthermore, the merge vector/merge index determination unit 2720 has a function of determining a merge index corresponding to the determined merge vector with the minimum cost.

The intra prediction mode determination unit 2730 has a function of determining a mode with the minimum cost among a plurality of intra prediction modes.

The predictive coding mode determination unit 2740 receives an input of a provisional motion vector and a cost relating to the provisional motion vector output from the motion vector search unit 2710. Furthermore, the predictive coding mode determination unit 2740 receives an input of merge information and a cost relating to the merge information output from the merge vector/merge index determination unit 2720. Furthermore, the predictive coding mode determination unit 2740 receives an input of intra mode information and a cost relating to the intra mode information output from the intra prediction mode determination unit 2730.

The predictive coding mode determination unit 2740 determines, on the basis of the input information, which prediction mode to use as a predictive coding mode for the block to be coded; a prediction vector mode in which a provisional motion vector is used, a merge mode, or an intra prediction mode.

The prediction information buffer 2750 has a function of holding determined predictive coding information such as motion information. The prediction information buffer 2750 receives an input of the determined predictive coding information from the predictive coding mode determination unit 2740.

Figure 3:
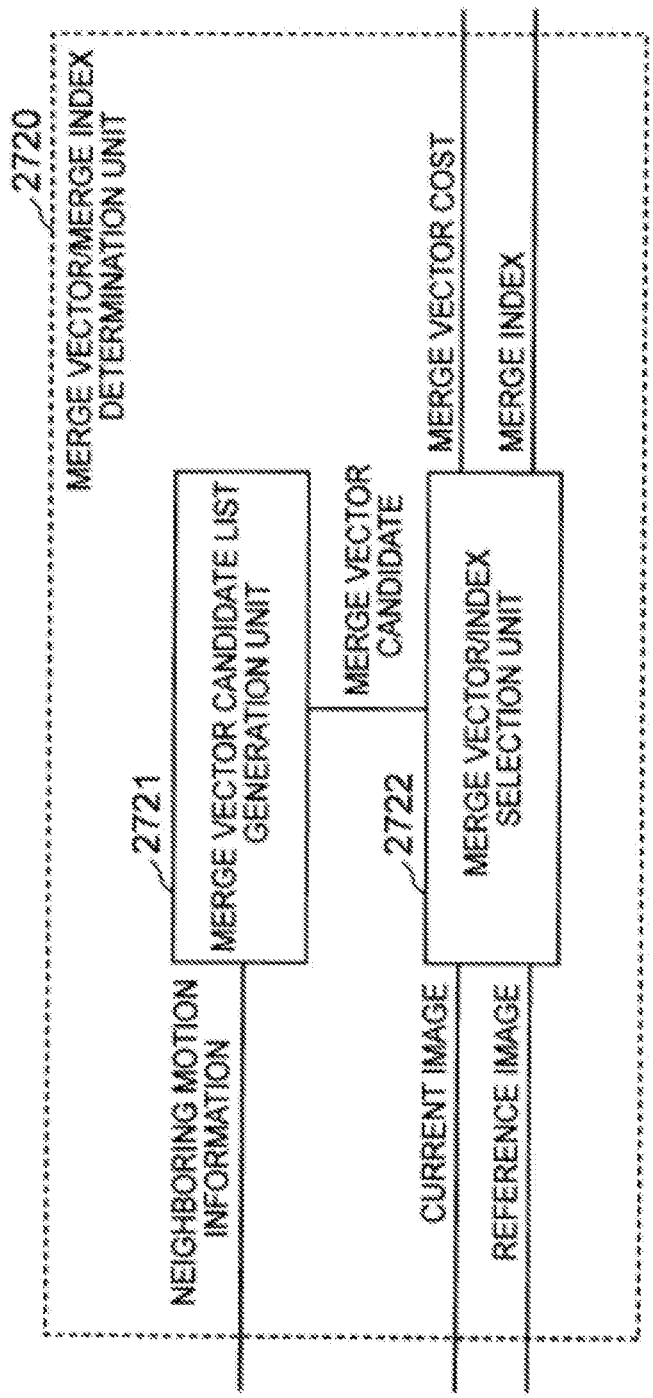
FIG. 3 is a block diagram showing a configuration example of a merge vector/merge index determination unit 2720.

FIG. 3 is a block diagram showing a configuration example of the merge vector/merge index determination unit 2720. The merge vector/merge index determination unit 2720 shown in FIG. 3 includes a merge vector candidate list generation unit 2721 and a merge vector/index selection unit 2722.

The merge vector candidate list generation unit 2721 has a function of generating a list of motion vectors that are merge vector candidates, on the basis of predictive coding information of spatial neighboring blocks or predictive coding information of temporal neighboring blocks. A spatial neighboring block is, for example, a block that is adjacent to a block to be coded. A temporal neighboring block is, for example, a block located at the same position as a block to be coded in another frame.

The merge vector/index selection unit 2722 computes, on the basis of a current image and a reference image, an appraisal cost for each merge vector candidate included in the list generated by the merge vector candidate list generation unit 2721. The merge vector/index selection unit 2722 selects a merge vector with the minimum appraisal cost among the computed appraisal costs, and selects an index for the selected merge vector. The merge vector/index selection unit 2722 outputs merge information that includes the selected merge vector and merge index, and the appraisal cost relating to the selected merge vector.

Description of Operation

Figure 4:
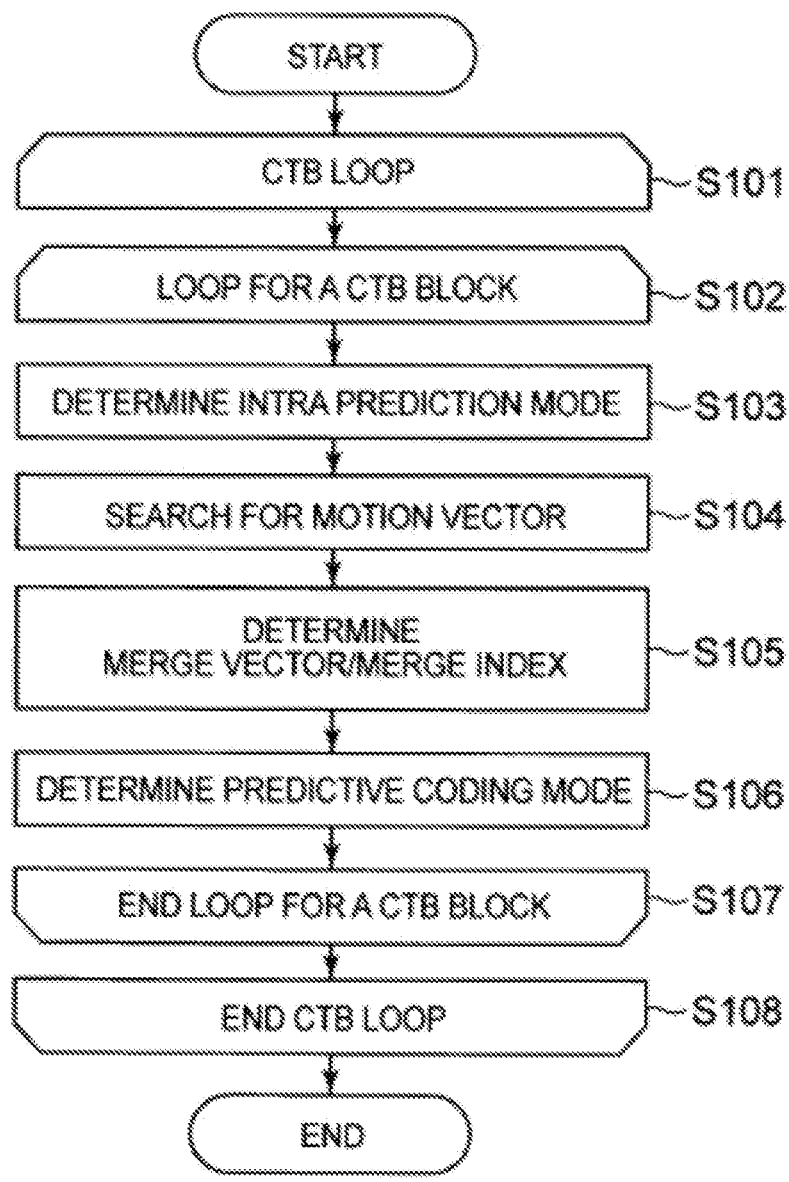
FIG. 4 is a flowchart showing an operation of predictive coding mode determination processing by the predictive coding information determination unit 2700 of the first exemplary embodiment.

An operation of the predictive coding information determination unit 2700 of the present exemplary embodiment will be described below with reference to FIGS. 4 to 6. FIG. 4 is a flowchart showing an operation of predictive coding mode determination processing by the predictive coding information determination unit 2700 of the first exemplary embodiment.

FIG. 4 shows an operation example in which intra prediction mode determination processing, motion vector search processing, merge vector/merge index determination processing, and predictive coding mode determination processing are continuously performed on one block to be coded for each CTB.

The predictive coding information determination unit 2700 receives an input of one CTB that has not yet been processed among CTBs constituting an input image. That is, the predictive coding information determination unit 2700 enters a CTB loop (step S101).

The predictive coding information determination unit 2700 selects, from blocks in the input CTB, one block for which a predictive coding mode has not yet been determined. That is, the predictive coding information determination unit 2700 enters a loop for a CTB block (step S102).

The intra prediction mode determination unit 2730 determines, for the selected block, an intra prediction mode with the minimum cost (step S103).

Next, the motion vector search unit 2710 determines, for the selected block, a provisional motion vector with the minimum cost among many motion vector candidates in a search range (step S104).

Next, the merge vector/merge index determination unit 2720 determines, for the selected block, a merge vector with the minimum cost among a plurality of merge vector candidates derived from motion vectors of neighboring blocks. Furthermore, the merge vector/merge index determination unit 2720 determines a merge index corresponding to the determined merge vector (step S105).

Next, the predictive coding mode determination unit 2740 determines a predictive coding mode for the selected block on the basis of information input from each of the intra prediction mode determination unit 2730, the motion vector search unit 2710, and the merge vector/merge index determination unit 2720 (step S106).

The predictive coding information determination unit 2700 repeats the processing of steps S103 to S106 as long as the blocks in the input CTB include a block for which a predictive coding mode has not been determined. When a predictive coding mode has been determined for every block in the CTB, the predictive coding information determination unit 2700 exits the loop for a CTB block (step S107).

The predictive coding information determination unit 2700 repeats the processing of steps S102 to S107 as long as the CTBs constituting the input image include a CTB that has not been processed. When all the CTBs constituting the input image have been processed, the predictive coding information determination unit 2700 exits the CTB loop (step S108) and ends the predictive coding mode determination processing.

Next, another operation example of the predictive coding mode determination processing by the predictive coding information determination unit 2700 will be described. FIG. 5 is a flowchart showing another operation of predictive coding mode determination processing by the predictive coding information determination unit 2700 of the first exemplary embodiment.

Figure 5:
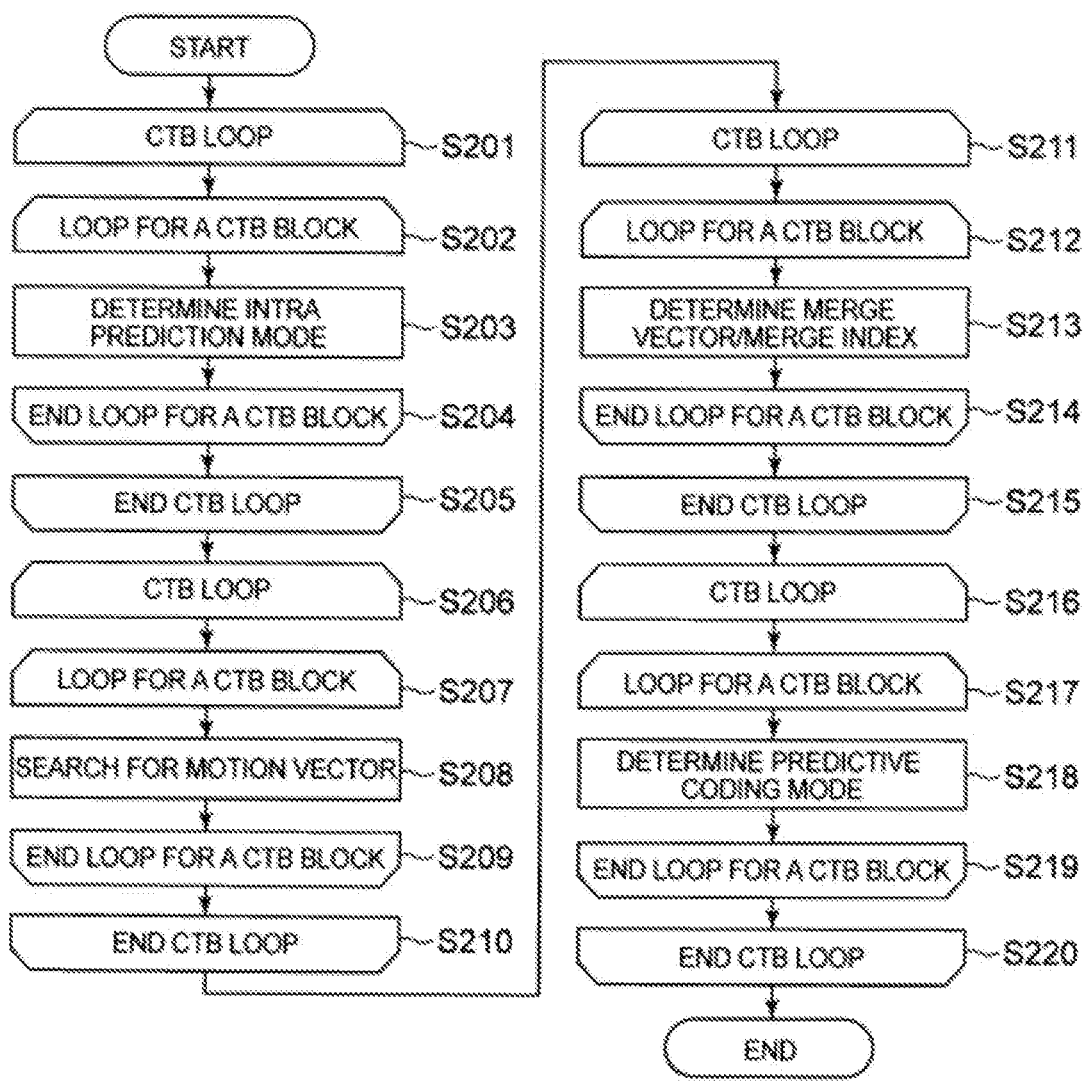
FIG. 5 is a flowchart showing another operation of predictive coding mode determination processing by the predictive coding information determination unit 2700 of the first exemplary embodiment.

FIG. 5 shows an operation example in which intra prediction mode determination processing, motion vector search processing, merge vector/merge index determination processing, and predictive coding mode determination processing are sequentially performed on one input image.

The intra prediction mode determination unit 2730 receives an input of one CTB that has not yet been processed among CTBs constituting the input image. That is, the intra prediction mode determination unit 2730 enters a CTB loop (step S201). Furthermore, the intra prediction mode determination unit 2730 selects, from blocks in the input CTB, one block for which an intra prediction mode has not yet been determined. That is, the intra prediction mode determination unit 2730 enters a loop for a CTB block (step S202).

Processing of step S203 is similar to the processing of step S103 shown in FIG. 4. The intra prediction mode determination unit 2730 repeats the processing of step S203 as long as the blocks in the input CTB include a block for which an intra prediction mode has not been determined.

When an intra prediction mode has been determined for every block in the CTB, the intra prediction mode determination unit 2730 exits the loop for a CTB block (step S204). Furthermore, the intra prediction mode determination unit 2730 repeats the processing of steps S202 to S204 as long as the CTBs constituting the input image include a CTB that has not been processed. When all the CTBs constituting the input image have been processed, the intra prediction mode determination unit 2730 exits the CTB loop (step S205).

Next, the motion vector search unit 2710 receives an input of one CTB that has not yet been processed among the CTBs constituting the input image. That is, the motion vector search unit 2710 enters a CTB loop (step S206). Furthermore, the motion vector search unit 2710 selects, from blocks in the input CTB, one block for which a provisional motion vector has not yet been determined. That is, the motion vector search unit 2710 enters a loop for a CTB block (step S207).

Processing of step S208 is similar to the processing of step S104 shown in FIG. 4. The motion vector search unit 2710 repeats the processing of step S208 as long as the blocks in the input CTB include a block for which a provisional motion vector has not been determined.

When a provisional motion vector has been determined for every block in the CTB, the motion vector search unit 2710 exits the loop for a CTB block (step S209). Furthermore, the motion vector search unit 2710 repeats the processing of steps S207 to S209 as long as the CTBs constituting the input image include a CTB that has not been processed. When all the CTBs constituting the input image have been processed, the motion vector search unit 2710 exits the CTB loop (step S210).

Next, the merge vector/merge index determination unit 2720 receives an input of one CTB that has not yet been processed among the CTBs constituting the input image. That is, the merge vector/merge index determination unit 2720 enters a CTB loop (step S211). Furthermore, the merge vector/merge index determination unit 2720 selects, from blocks in the input CTB, one block for which a merge vector and a merge index have not yet been determined. That is, the merge vector/merge index determination unit 2720 enters a loop for a CTB block (step S212).

Processing of step S213 is similar to the processing of step S105 shown in FIG. 4. The merge vector/merge index determination unit 2720 repeats the processing of step S213 as long as the blocks in the input CTB include a block for which a merge vector and a merge index have not been determined.

When a merge vector and a merge index have been determined for every block in the CTB, the merge vector/merge index determination unit 2720 exits the loop for a CTB block (step S214). Furthermore, the merge vector/merge index determination unit 2720 repeats the processing of steps S212 to S214 as long as the CTBs constituting the input image include a CTB that has not been processed. When all the CTBs constituting the input image have been processed, the merge vector/merge index determination unit 2720 exits the CTB loop (step S215).

Next, the predictive coding mode determination unit 2740 receives an input of one CTB that has not yet been processed among the CTBs constituting the input image. That is, the predictive coding mode determination unit 2740 enters a CTB loop (step S216). Furthermore, the predictive coding mode determination unit 2740 selects, from blocks in the input CTB, one block for which a predictive coding mode has not yet been determined. That is, the predictive coding mode determination unit 2740 enters a loop for a CTB block (step S217).

Processing of step S218 is similar to the processing of step S106 shown in FIG. 4. The predictive coding mode determination unit 2740 repeats the processing of step S218 as long as the blocks in the input CTB include a block for which a predictive coding mode has not been determined.

When a predictive coding mode has been determined for every block in the CTB, the predictive coding mode determination unit 2740 exits the loop for a CTB block (step S219). Furthermore, the predictive coding mode determination unit 2740 repeats the processing of steps S217 to S219 as long as the CTBs constituting the input image include a CTB that has not been processed. When all the CTBs constituting the input image have been processed, the predictive coding mode determination unit 2740 exits the CTB loop (step S220) and ends the predictive coding mode determination processing.

Since each of motion vector search processing, merge vector/merge index determination processing, and predictive coding mode determination processing is processing to be performed independently for each CTB, pieces of processing for the corresponding CTBs may be performed in parallel. That is, the predictive coding information determination unit 2700 may perform the pieces of processing of the CTB loops shown in FIGS. 4 and 5 in parallel for each CTB.

Next, an operation example of merge vector candidate list generation processing by the merge vector candidate list generation unit 2721 will be described. FIG. 6 is a flowchart showing an operation of merge vector candidate list generation processing by the merge vector candidate list generation unit 2721. Note that the processing shown in FIG. 6 corresponds to a part of the processing of step S105 shown in FIG. 4 or a part of the processing of step S213 shown in FIG. 5.

Figure 19:
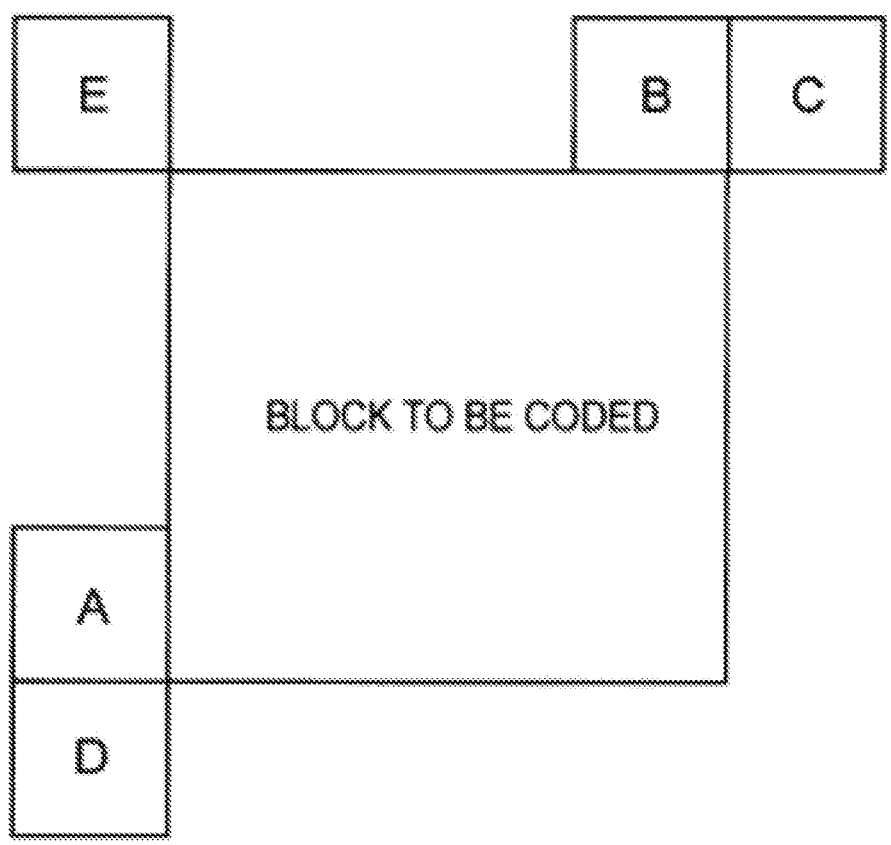
FIG. 19 is an explanatory diagram showing spatial neighboring blocks of a block to be coded.

The merge vector candidate list generation unit 2721 sets, as candidate blocks, for example, blocks A, B, C, D, and E located around a block to be processed shown in FIG. 19 and blocks that are in temporal neighboring frames and located at the same position as the block to be processed. The merge vector candidate list generation unit 2721 selects, from the candidate blocks, one block that has not yet been verified. That is, the merge vector candidate list generation unit 2721 enters a candidate block loop (step S301).

The merge vector candidate list generation unit 2721 checks whether the selected candidate block is in the same CTB as the block to be processed (step S302).

In a case where the selected candidate block is not in the same CTB (No in step S302), the merge vector candidate list generation unit 2721 does not add motion information of the selected candidate block to a merge vector candidate list. The merge vector candidate list generation unit 2721 ends verification of the selected candidate block, and selects a next candidate block (step S301).

In a case where the selected candidate block is in the same CTB (Yes in step S302), the merge vector candidate list generation unit 2721 checks whether the selected candidate block is a valid block (step S303). Note that cases where the selected candidate block is in the same CTB include a case where the candidate block and the block to be processed belong to different frames.

A valid block is a block that is in a frame and has not been coded in an intra prediction mode. The reason why a block that is in a frame and has not been coded in an intra prediction mode is made a valid block is that blocks that are outside the frame and blocks that have been coded in an intra prediction mode do not have a motion vector.

In a case where the selected candidate block is not a valid block (No in step S303), the merge vector candidate list generation unit 2721 does not add the motion information of the selected candidate block to the merge vector candidate list. The merge vector candidate list generation unit 2721 ends verification of the selected candidate block, and selects a next candidate block (step S301).

In a case where the selected candidate block is a valid block (Yes in step S303), the merge vector candidate list generation unit 2721 adds the motion information of the selected candidate block as a merge vector candidate to the merge vector candidate list (step S304).

Next, the merge vector candidate list generation unit 2721 checks whether the number of merge vector candidates in the merge vector candidate list is equal to the maximum number of merge candidates (step S305). In a case where the number of merge vector candidates is equal to the maximum number of merge candidates (Yes in step S305), the merge vector candidate list generation unit 2721 exits the candidate block loop and ends the merge vector candidate list generation processing.

In a case where the number of merge vector candidates is not equal to the maximum number of merge candidates (No in step S305), the merge vector candidate list generation unit 2721 selects a next candidate block (step S301).

The merge vector candidate list generation unit 2721 repeats the processing of steps S302 to S305 as long as the candidate blocks include a candidate block that has not been verified. When all the candidate blocks have been verified, the merge vector candidate list generation unit 2721 exits the candidate block loop (step S306) and ends the merge vector candidate list generation processing.

Figure 6:
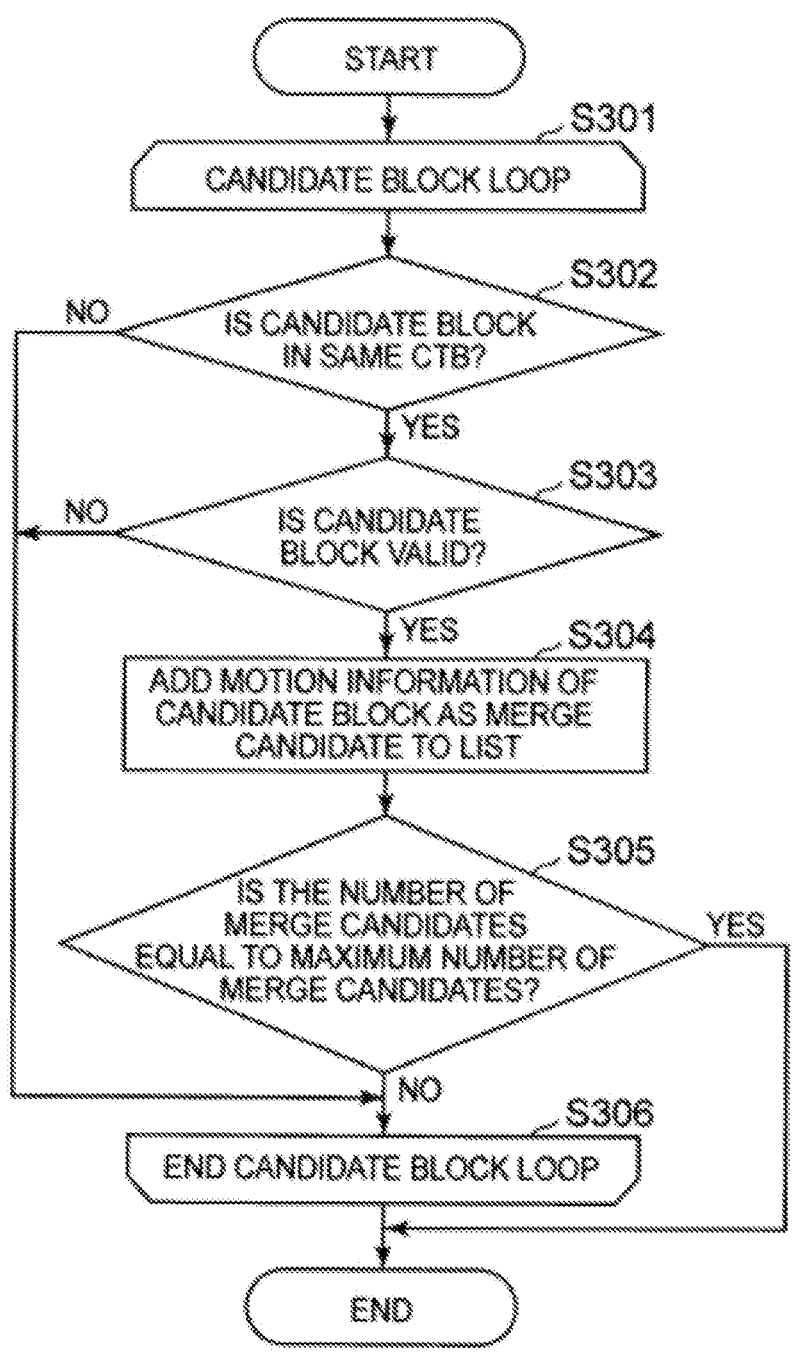
FIG. 6 is a flowchart showing an operation of merge vector candidate list generation processing by a merge vector candidate list generation unit 2721.

The merge vector candidate list generation unit 2721 of the present exemplary embodiment determines, in the processing of step S302 shown in FIG. 6, whether the candidate block is in the same CTB as the block to be coded. The merge vector candidate list generation unit 2721 adds, to the list, only motion information of candidate blocks in the same CTB as merge vector candidates, and this eliminates the need for predictive coding information of candidate blocks in other CTBs.

A general merge vector candidate list generation unit also adds, to the list, motion information of candidate blocks outside the same CTB as merge vector candidates, and it is therefore necessary that motion information of blocks in other CTBs has also been determined at the time of addition. Thus, there are dependencies among the pieces of processing relating to the corresponding CTBs, and the pieces of processing are not performed in parallel. Since the merge vector/merge index determination unit 2720 of the present exemplary embodiment does not reference predictive coding information of candidate blocks in other CTBs, pieces of processing relating to the corresponding CTBs can be performed in parallel.

For example, in a case where an image of 4K (3840×2160) in size is divided into CTUs of 64×64 in size, the moving image coding device 1001 of the present exemplary embodiment can process (3840×2160)/(64×64)=2025 tasks in parallel.

Consequently, in a case where the moving image coding device 1001 of the present exemplary embodiment is implemented by a many-core processor, more processor cores are utilized and the processing time for coding processing is shortened. Furthermore, as in a general moving image coding device, motion information of candidate blocks in the CTB is used, and this prevents a reduction in coding efficiency. Since the moving image coding device 1001 of the present exemplary embodiment can process many tasks in parallel while preventing a reduction in coding efficiency, coding processing can be performed at high speed.

Furthermore, when a moving image stream output from the moving image coding device 1001 of the present exemplary embodiment is decoded, predictive coding modes for the corresponding CTBs are determined in parallel. The reason is that it is not necessary to reference information of different CTBs during decoding, that is, there are no dependencies among the CTBs.

Second Exemplary Embodiment

Description of Configuration

Next, a second exemplary embodiment of the present invention will be described with reference to the drawings. A moving image coding device 1002 (not shown) of the present exemplary embodiment is different from the moving image coding device 1001 shown in FIG. 1 in that a predictive coding information determination unit 2701 is included instead of the predictive coding information determination unit 2700. The moving image coding device 1002 of the present exemplary embodiment derives a merge index in conformity with the H.265 standard.

Figure 7:
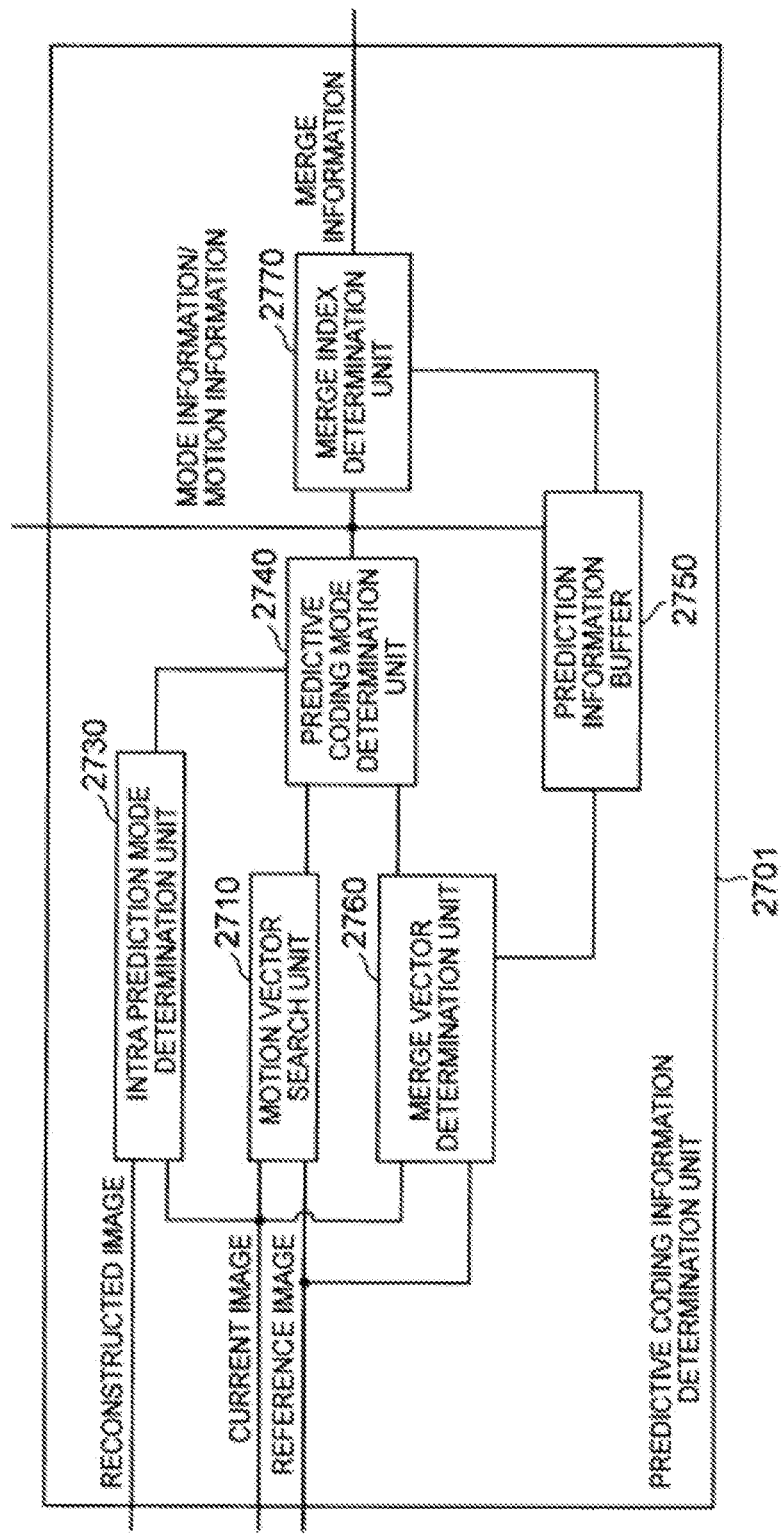
FIG. 7 is a block diagram showing a configuration example in a second exemplary embodiment of a predictive coding information determination unit 2701.

A configuration of the predictive coding information determination unit 2701 in the moving image coding device 1002 of the present exemplary embodiment is shown in FIG. 7. FIG. 7 is a block diagram showing a configuration example in the second exemplary embodiment of the predictive coding information determination unit 2701.

As shown in FIG. 7, the predictive coding information determination unit 2701 of the present exemplary embodiment is different from the predictive coding information determination unit 2700 shown in FIG. 2 in that a merge vector determination unit 2760 and a merge index determination unit 2770 are included instead of the merge vector/merge index determination unit 2720.

The configuration of the predictive coding information determination unit 2701 shown in FIG. 7, other than the merge vector determination unit 2760 and the merge index determination unit 2770, is similar to the configuration of the predictive coding information determination unit 2700 shown in FIG. 2. Furthermore, a predictive coding mode determination unit 2740 of the present exemplary embodiment has a function different from that of the predictive coding mode determination unit 2740 of the first exemplary embodiment.

The merge vector determination unit 2760 has a function of performing block matching or the like to determine a merge vector with the minimum cost among a plurality of merge vector candidates derived from motion vectors of neighboring blocks. When generating a merge vector candidate list, the merge vector determination unit 2760 does not reference blocks outside a CTB to which a block to be coded belongs.

The predictive coding mode determination unit 2740 determines, on the basis of input information, which prediction mode to use as a predictive coding mode for the block to be coded; an intra prediction mode or a motion-compensated prediction mode.

The predictive coding mode determination unit 2740 outputs the determined mode information. Furthermore, in a case where the motion-compensated prediction mode is determined to be used as the predictive coding mode, the predictive coding mode determination unit 2740 outputs only a motion vector and does not determine merge information. The mode information output from the predictive coding mode determination unit 2740 is input to the merge index determination unit 2770.

The merge index determination unit 2770 has a function of determining, on the basis of the input mode information, merge indexes corresponding to the plurality of merge vector candidates derived from the motion vectors of the neighboring blocks. When generating a merge vector candidate list, the merge index determination unit 2770 references blocks outside the CTB to which the block to be coded belongs.

Figure 8:
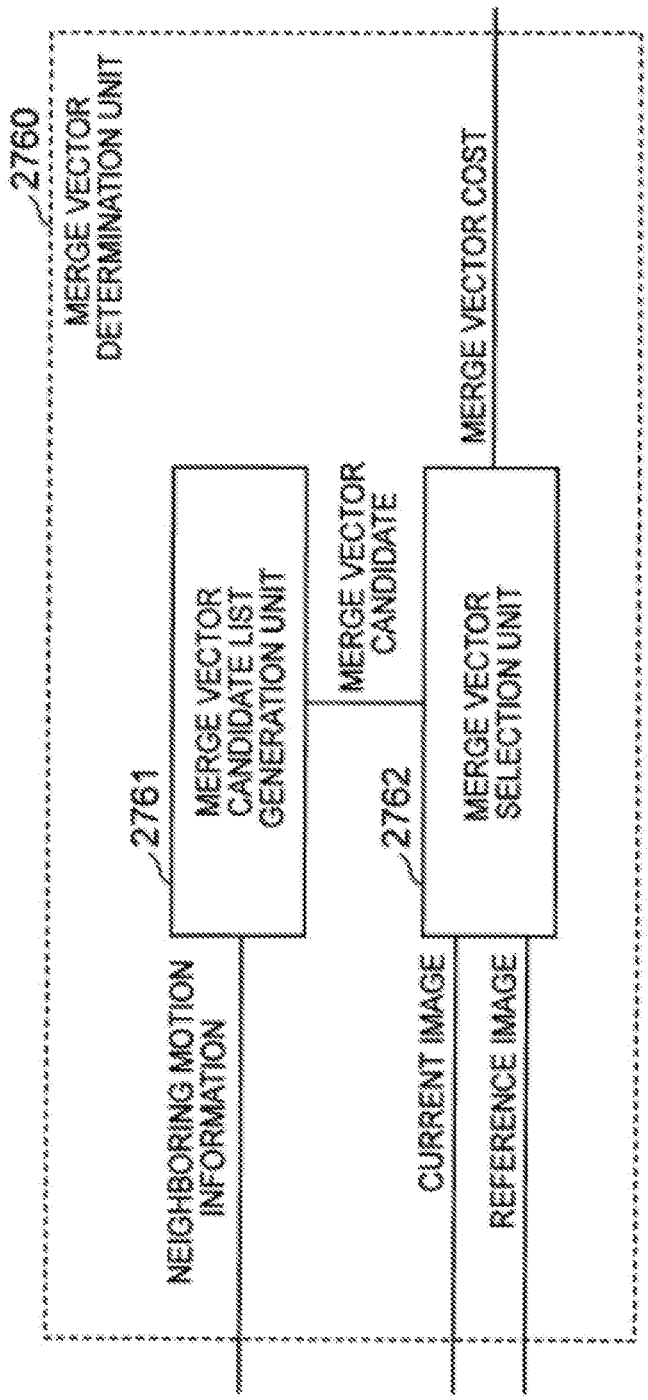
FIG. 8 is a block diagram showing a configuration example of a merge vector determination unit 2760.

Next, a configuration example of the merge vector determination unit 2760 is shown in FIG. 8. FIG. 8 is a block diagram showing the configuration example of the merge vector determination unit 2760. The merge vector determination unit 2760 shown in FIG. 8 includes a merge vector candidate list generation unit 2761 and a merge vector selection unit 2762.

The merge vector candidate list generation unit 2761 has a similar function as the merge vector candidate list generation unit 2721 shown in FIG. 3.

The merge vector selection unit 2762 computes, on the basis of a current image and a reference image, an appraisal cost for each merge vector candidate included in a list generated by the merge vector candidate list generation unit 2761. The merge vector selection unit 2762 selects a merge vector with the lowest appraisal cost among the computed appraisal costs, and outputs the selected merge vector and the appraisal cost relating to the merge vector. That is, unlike the merge vector/index selection unit 2722, the merge vector selection unit 2762 does not output merge indexes.

Figure 9:
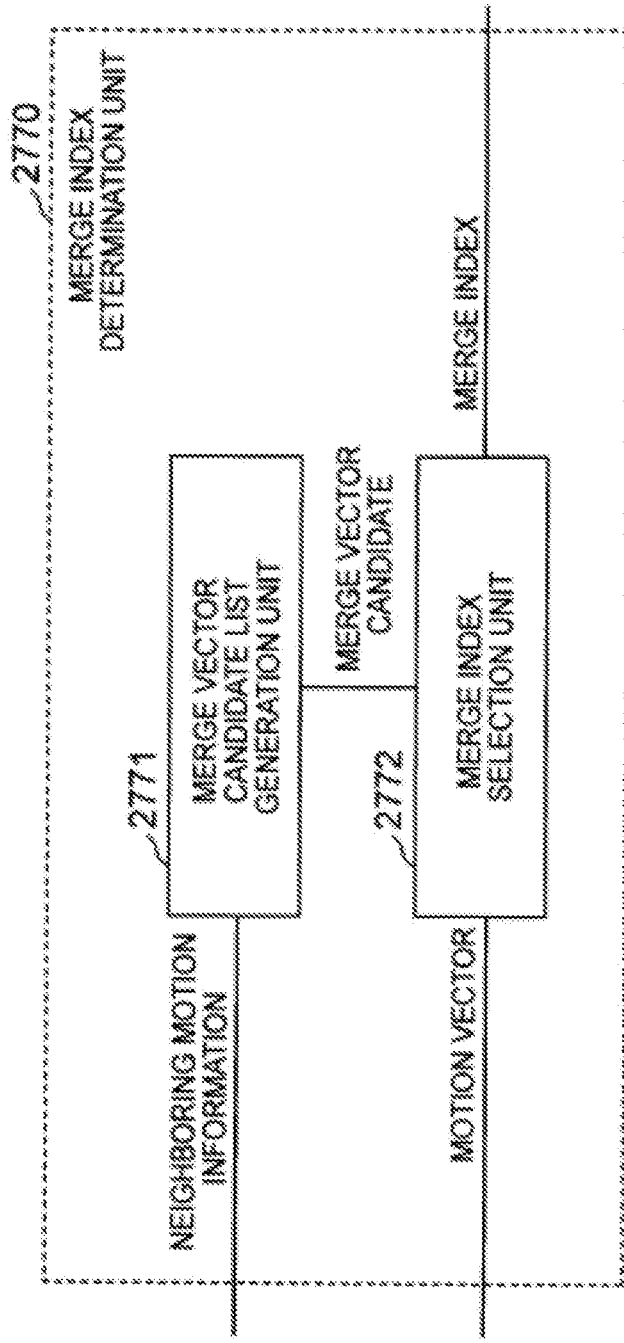
FIG. 9 is a block diagram showing a configuration example of a merge index determination unit 2770.

Next, a configuration example of the merge index determination unit 2770 is shown in FIG. 9. FIG. 9 is a block diagram showing the configuration example of the merge index determination unit 2770. The merge index determination unit 2770 shown in FIG. 9 includes a merge vector candidate list generation unit 2771 and a merge index selection unit 2772.

The merge vector candidate list generation unit 2771 has a function of generating a list of motion vectors that are merge vector candidates, on the basis of predictive coding information of spatial neighboring blocks or predictive coding information of temporal neighboring blocks. When generating the list, the merge vector candidate list generation unit 2771 does not check whether the neighboring blocks are in the same CTB as the block to be processed.

The merge index selection unit 2772 has a function of selecting a merge index corresponding to the list generated by the merge vector candidate list generation unit 2771. When selecting a merge index, the merge index selection unit 2772 uses mode information input from the predictive coding mode determination unit 2740. The merge index selection unit 2772 outputs the selected merge index.

Description of Operation

Figure 10:
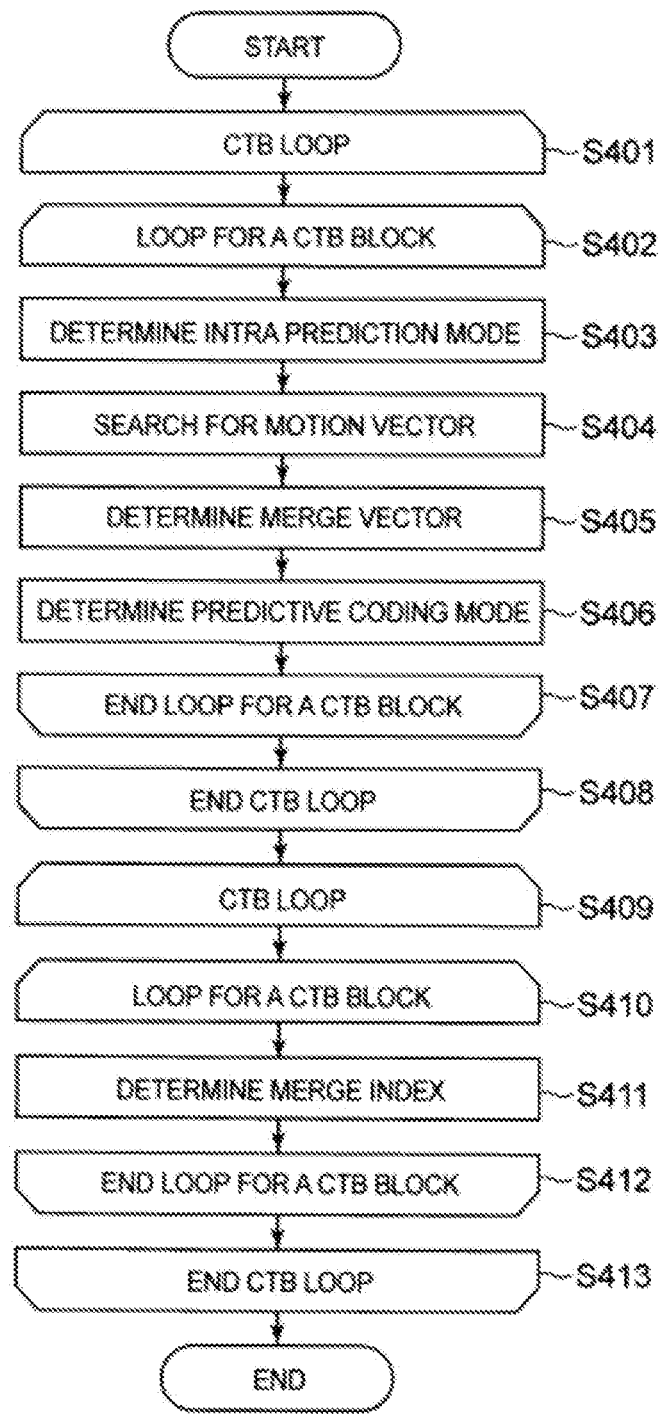
FIG. 10 is a flowchart showing an operation of predictive coding mode determination processing by the predictive coding information determination unit 2701 of the second exemplary embodiment.

An operation of the predictive coding information determination unit 2701 of the present exemplary embodiment will be described below with reference to FIG. 10. FIG. 10 is a flowchart showing an operation of predictive coding mode determination processing by the predictive coding information determination unit 2701 of the second exemplary embodiment.

FIG. 10 shows an operation example in which intra prediction mode determination processing, motion vector search processing, merge vector determination processing, and predictive coding mode determination processing are continuously performed on one block to be coded for each CTB, and then merge index determination processing is performed on one block to be coded for each CTB.

Processing of steps S401 to S404 is similar to the processing of steps S101 to S104 shown in FIG. 4.

The merge vector determination unit 2760 determines, for a selected block, a merge vector with the minimum cost among a plurality of merge vector candidates derived from motion vectors of neighboring blocks (step S405).

Processing of steps S406 to S408 is similar to the processing of steps S106 to S108 shown in FIG. 4.

The merge index determination unit 2770 receives an input of one CTB that has not yet been processed among CTBs constituting an input image. That is, the merge index determination unit 2770 enters a CTB loop (step S409).

On the basis of input merge information, the merge index determination unit 2770 selects, from blocks in the input CTB for which a motion-compensated prediction mode is determined to be used as a predictive coding mode, one block for which a merge index has not yet been determined. That is, the merge index determination unit 2770 enters a loop for a CTB block (step S410).

The merge vector candidate list generation unit 2771 generates, for the selected block, a merge vector candidate list including a plurality of merge vector candidates from motion vectors of neighboring blocks. Next, the merge index selection unit 2772 determines a merge index corresponding to the generated merge vector candidate list (step S411).

The merge index determination unit 2770 repeats the processing of step S411 as long as the blocks in the input CTB for which a motion-compensated prediction mode is determined to be used as a predictive coding mode include a block for which a merge index has not been determined. When a merge index has been determined for every block in the CTB for which a motion-compensated prediction mode is determined to be used as a predictive coding mode, the merge index determination unit 2770 exits the loop for a CTB block (step S412).

The merge index determination unit 2770 repeats the processing of steps S410 to S412 as long as the CTBs constituting the input image include a CTB that has not been processed. When all the CTBs constituting the input image have been processed, the merge index determination unit 2770 exits the CTB loop (step S413) and ends the predictive coding mode determination processing.

Note that the predictive coding information determination unit 2701 of the present exemplary embodiment, as in the example shown in FIG. 5, may sequentially perform, on one input image, intra prediction mode determination processing, motion vector search processing, merge vector determination processing, predictive coding mode determination processing, and merge index determination processing.

Since each of motion vector search processing, merge vector determination processing, and predictive coding mode determination processing is processing to be performed independently for each CTB, pieces of processing for the corresponding CTBs may be performed in parallel.

Furthermore, the merge index determination unit 2770 receives an input of motion information and mode information of blocks outside a CTB. That is, after a predictive coding mode has been determined for every CTB, the merge index determination unit 2770 can perform merge index determination processing in parallel for each CTB. That is, the predictive coding information determination unit 2701 may perform the pieces of processing of the CTB loops shown in FIG. 10 in parallel for each CTB.

Figure 11:
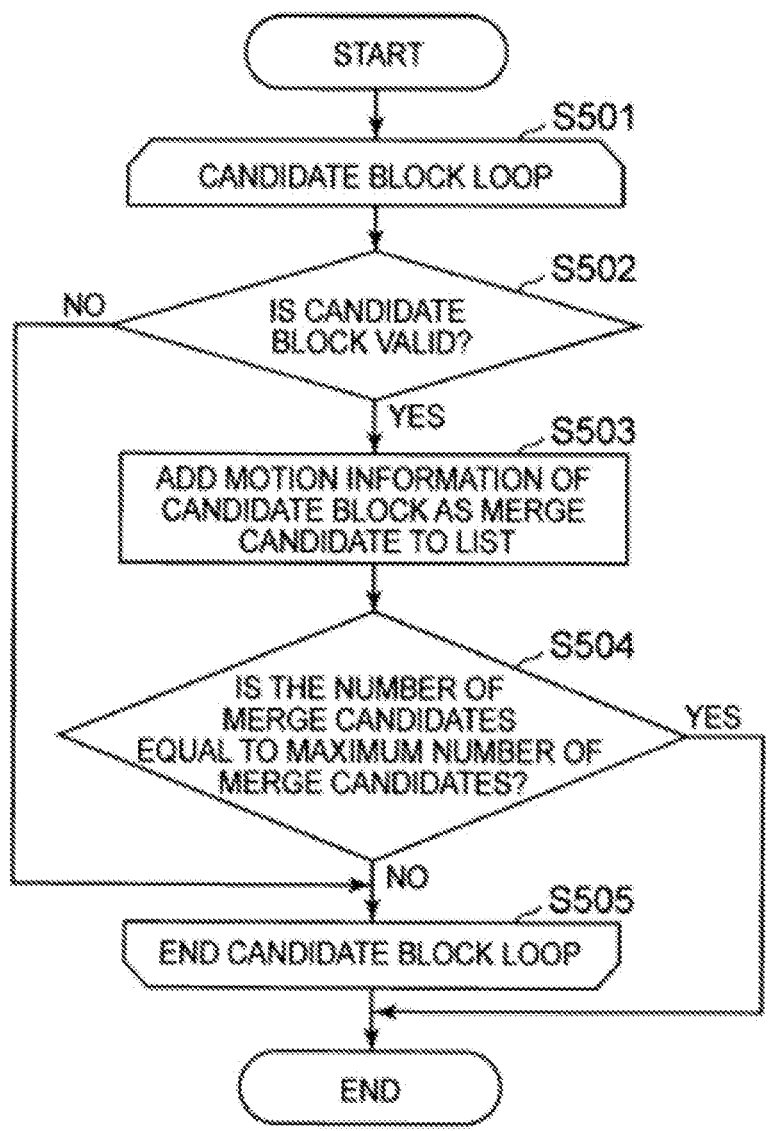
FIG. 11 is a flowchart showing an operation of merge vector candidate list generation processing by a merge vector candidate list generation unit 2771.

Next, an operation example of merge vector candidate list generation processing by the merge vector candidate list generation unit 2771 will be described. FIG. 11 is a flowchart showing an operation of merge vector candidate list generation processing by the merge vector candidate list generation unit 2771. Note that the processing shown in FIG. 11 corresponds to a part of the processing of step S411 shown in FIG. 10.

The merge vector candidate list generation unit 2771 also adds, to a list, motion information of blocks outside a CTB to which a block to be processed belongs, as merge vector candidates. That is, the operation example shown in FIG. 11 does not include the processing of step S302 shown in FIG. 6 for checking whether the selected candidate block is in the same CTB as the block to be processed.

Processing of step S501 is similar to the processing of step S301 shown in FIG. 6. Furthermore, processing of steps S502 to S505 is similar to the processing of steps S303 to S306 shown in FIG. 6.

The merge vector candidate list generation unit 2771 also adds the motion information of the blocks outside the CTB to the merge vector candidates. That is, the generated merge vector candidate list is a list compliant with the H.265 standard. In the present exemplary embodiment, motion information of blocks outside a CTB is also used as merge vectors, and this may improve the accuracy of coding as compared to the first exemplary embodiment.

Figure 12:
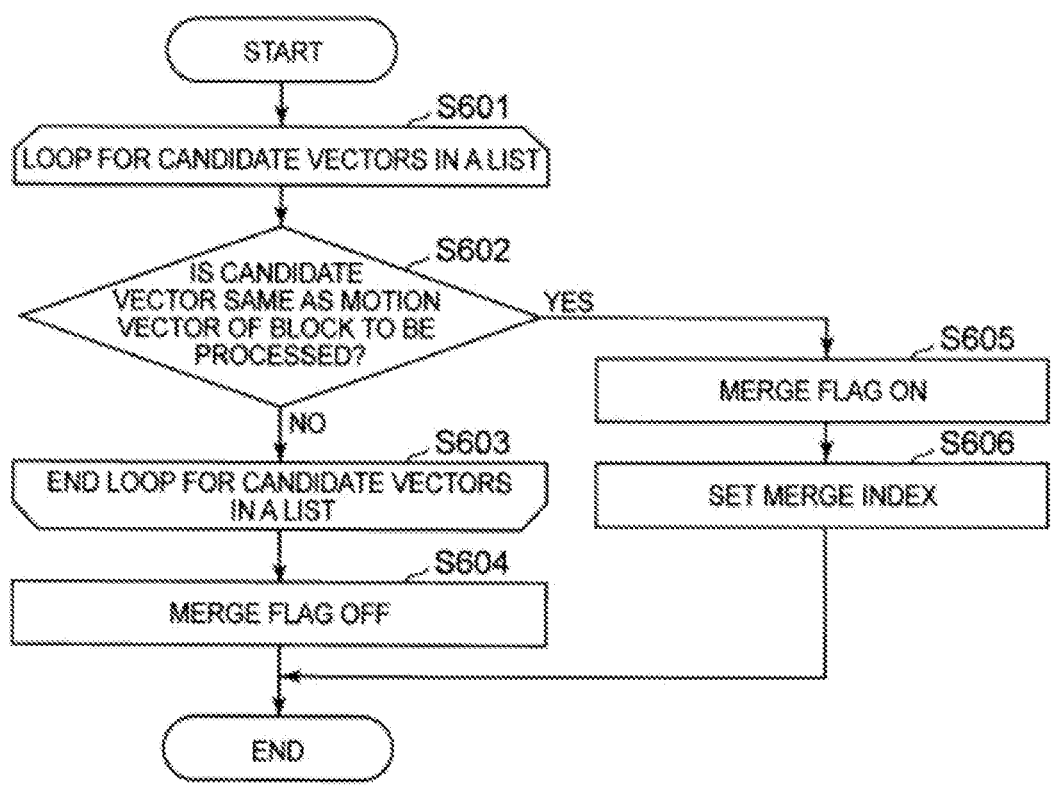
FIG. 12 is a flowchart showing an operation of merge index selection processing by a merge index selection unit 2772.

Next, an operation example of merge index selection processing by the merge index selection unit 2772 will be described. FIG. 12 is a flowchart showing an operation of the merge index selection processing by the merge index selection unit 2772. Note that the processing shown in FIG. 12 corresponds to a part of the processing of step S411 shown in FIG. 10.

The merge index selection unit 2772 selects, from the merge vector candidates in the list generated by the merge vector candidate list generation unit 2771, one merge vector candidate that has not yet been verified. That is, the merge index selection unit 2772 enters a loop for candidate vectors in a list (step S601).

The merge index selection unit 2772 checks whether the selected merge vector candidate is the same as a motion vector relating to a block to be processed input from the predictive coding mode determination unit 2740 (step S602).

In a case where the selected merge vector candidate is not the same as the motion vector relating to the block to be processed (No in step S602), the merge index selection unit 2772 ends verification of the selected merge vector candidate and selects a next merge vector candidate (step S601).

In a case where the selected merge vector candidate is the same as the motion vector relating to the block to be processed (Yes in step S602), the merge index selection unit 2772 exits the loop for candidate vectors in a list. The merge index selection unit 2772 sets a merge flag, which is a flag indicating whether a predictive coding mode of the block to be processed is a merge mode, to ON (step S605). The merge flag set to ON indicates that the predictive coding mode is the merge mode.

That is, even in a case where the predictive coding mode determined by the predictive coding mode determination unit 2740 is a prediction vector mode, the merge index selection unit 2772 sets the merge flag to ON in a case where the motion vector relating to the block to be processed is the same as the merge vector candidate. By setting the merge flag to ON, the predictive coding mode is changed from the prediction vector mode to the merge mode.

Next, the merge index selection unit 2772 sets an index of the list as a merge index (step S606). The set merge index is compliant with the H.265 standard because the merge index also includes motion information of blocks outside the CTB. After the setting, the merge index selection unit 2772 ends the merge index selection processing.

The merge index selection unit 2772 repeats the processing of step S602 as long as the merge vector candidates include a merge vector candidate that has not been verified. In a case where a result of verifying all merge vector candidates indicates that the list does not include any merge vector candidate that is the same as the motion vector relating to the block to be processed, the merge index selection unit 2772 exits the loop for candidate vectors in a list (step S603).

Next, the merge index selection unit 2772 sets the merge flag to OFF (step S604). The merge flag that has been set to OFF indicates that the predictive coding mode is not the merge mode. After the setting, the merge index selection unit 2772 ends the merge index selection processing.

In the present exemplary embodiment, after a predictive coding mode has been determined for each block to be coded, the merge index determination unit 2770 sets again a merge index compliant with the H.265 standard. Thus, not only a dedicated decoder but also any decoder compliant with the H.265 standard can decode a bitstream output by the moving image coding device 1002 of the present exemplary embodiment.

Third Exemplary Embodiment

Description of Configuration

Next, a third exemplary embodiment of the present invention will be described with reference to the drawings. A configuration of a moving image coding device 1002 of the present exemplary embodiment is similar to the configuration of the moving image coding device 1002 of the second exemplary embodiment. Furthermore, a configuration of a predictive coding information determination unit 2701 in the moving image coding device 1002 of the present exemplary embodiment is similar to the configuration of the predictive coding information determination unit 2701 shown in FIG. 7.

The moving image coding device 1002 of the present exemplary embodiment repeats merge vector determination processing and predictive coding mode determination processing a plurality of times to compute motion information with higher accuracy than the first and second exemplary embodiments and improve the coding efficiency.

Note that, when generating a merge vector candidate list, a merge vector candidate list generation unit 2761 of the present exemplary embodiment also adds motion information of blocks outside a CTB to which a block to be processed belongs, as merge vector candidates.

Description of Operation

Figure 13:
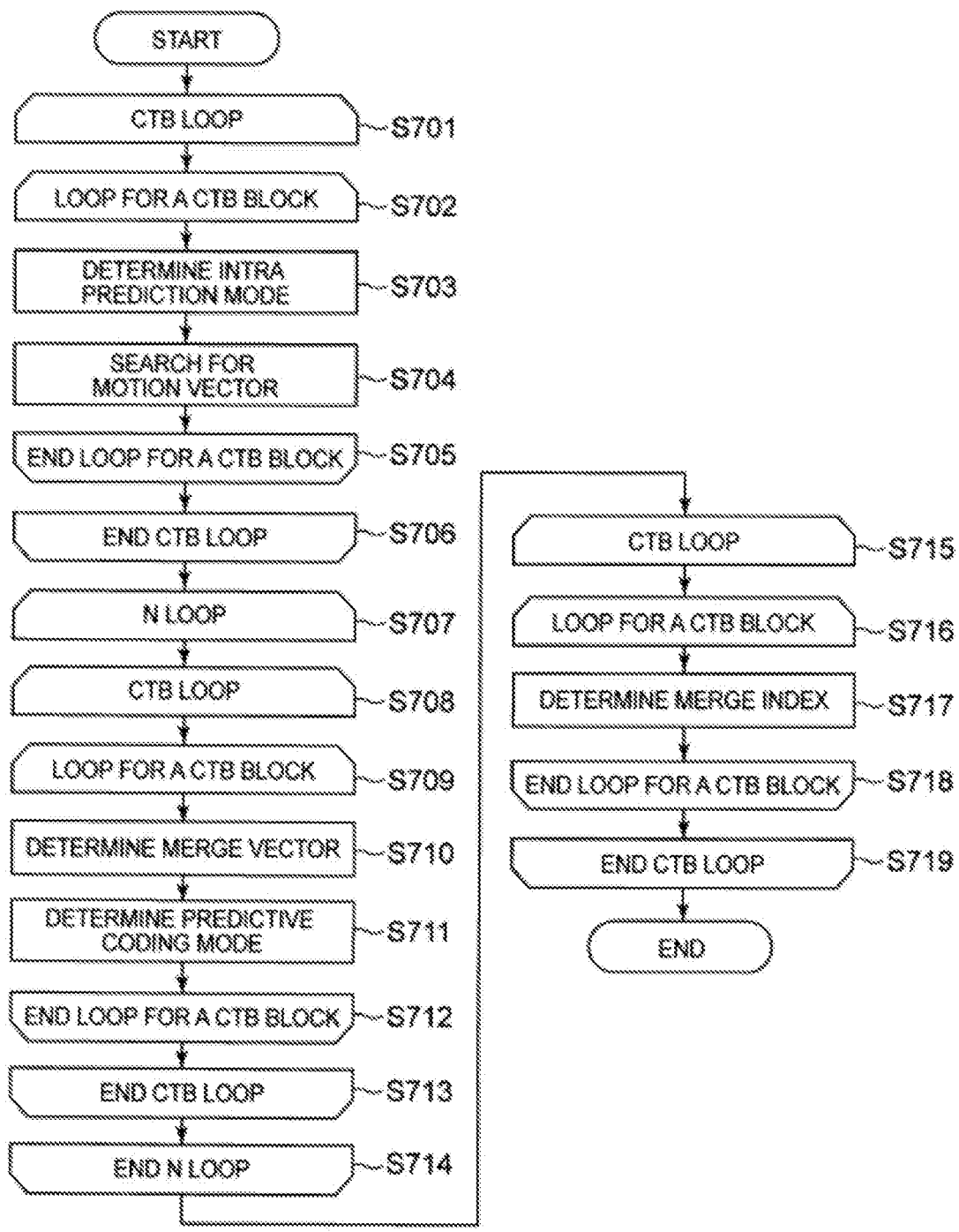
FIG. 13 is a flowchart showing an operation of predictive coding mode determination processing by a predictive coding information determination unit 2701 of a third exemplary embodiment.

An operation of the predictive coding information determination unit 2701 of the present exemplary embodiment will be described below with reference to FIG. 13. FIG. 13 is a flowchart showing an operation of predictive coding mode determination processing by the predictive coding information determination unit 2701 of the third exemplary embodiment.

The predictive coding information determination unit 2701 receives an input of one CTB that has not yet been processed among CTBs constituting an input image. That is, the predictive coding information determination unit 2701 enters a CTB loop (step S701). Furthermore, the predictive coding information determination unit 2701 selects, from blocks in the input CTB, one block for which an intra prediction mode and a provisional motion vector have not yet been determined. That is, the predictive coding information determination unit 2701 enters a loop for a CTB block (step S702).

Processing of steps S703 and S704 is similar to the processing of steps S403 and S404 shown in FIG. 10.

The predictive coding information determination unit 2701 repeats the processing of steps S703 and S704 as long as the blocks in the input CTB include a block for which an intra prediction mode and a provisional motion vector have not been determined. When an intra prediction mode and a provisional motion vector have been determined for every block in the CTB, the predictive coding information determination unit 2701 exits the loop for a CTB block (step S705).

Furthermore, the predictive coding information determination unit 2701 repeats the processing of steps S702 to S705 as long as the CTBs constituting the input image include a CTB that has not been processed. When all the CTBs constituting the input image have been processed, the predictive coding information determination unit 2701 exits the CTB loop (step S706).

Next, the predictive coding information determination unit 2701 enters an N loop (step S707). N is an integer equal to or larger than 1. Furthermore, the number of loops performed by the predictive coding information determination unit 2701 in the N loop is expressed by n.

Next, the predictive coding information determination unit 2701 receives an input of one CTB that has not yet been processed among the CTBs constituting the input image. That is, the predictive coding information determination unit 2701 enters a CTB loop (step S708). Furthermore, the predictive coding information determination unit 2701 selects, from blocks in the input CTB, one block for which a merge vector and a predictive coding mode have not yet been determined. That is, the predictive coding information determination unit 2701 enters a loop for a CTB block (step S709).

A merge vector determination unit 2760 determines, for the selected block, a merge vector with the minimum cost among a plurality of merge vector candidates derived from motion vectors of neighboring blocks (step S710).

An operation of merge vector candidate list generation by the merge vector candidate list generation unit 2761 is similar to the operation shown in FIG. 11. When n=1, the merge vector candidate list generation unit 2761 does not receive an input of motion information of neighboring blocks outside the CTB. Alternatively, when n=1, the merge vector candidate list generation unit 2761 receives an input of motion information output from a motion vector search unit 2710, as motion information of neighboring blocks outside the CTB.

When n≥2, the merge vector candidate list generation unit 2761 receives an input of motion information of neighboring blocks outside the CTB included in predictive coding mode information output from a predictive coding mode determination unit 2740 at the time of (n−1).

Processing of step S711 is similar to the processing of step S406 shown in FIG. 10.

The predictive coding information determination unit 2701 repeats the processing of steps S710 and S711 as long as the blocks in the input CTB include a block for which a merge vector and a predictive coding mode have not been determined. When a merge vector and a predictive coding mode have been determined for every block in the CTB, the predictive coding information determination unit 2701 exits the loop for a CTB block (step S712).

Furthermore, the predictive coding information determination unit 2701 repeats the processing of steps S709 to S712 as long as the CTBs constituting the input image include a CTB that has not been processed. When all the CTBs constituting the input image have been processed, the predictive coding information determination unit 2701 exits the CTB loop (step S713), and adds 1 to n.

The predictive coding information determination unit 2701 repeats the processing of steps S708 to S713 as long as n<N. When n=N, the predictive coding information determination unit 2701 exits the N loop (step S714).

Processing of steps S715 to S719 is similar to the processing of steps S409 to S413 shown in FIG. 10.

Note that the predictive coding information determination unit 2701 may perform the pieces of processing of the CTB loops shown in FIG. 13 in parallel for each CTB.

The merge vector determination unit 2760 of the present exemplary embodiment repeats the merge vector determination processing. Furthermore, the predictive coding mode determination unit 2740 repeats the predictive coding mode determination processing. Thus, the merge vector determination unit 2760 can also reference motion information of neighboring blocks outside the CTB to which the block to be processed belongs that have been generated in the previous predictive coding mode determination processing. That is, the moving image coding device 1002 of the present exemplary embodiment can improve the accuracy of motion information and increase the coding efficiency as compared with the first and second exemplary embodiments.

Furthermore, in the present exemplary embodiment, as in the second exemplary embodiment, a merge index determination unit 2770 sets again a merge index that is compliant with the H.265 standard after the predictive coding mode determination unit 2740 has determined a predictive coding mode for a predetermined time. Thus, not only a dedicated decoder but also any decoder compliant with the H.265 standard can decode a bitstream output by the moving image coding device 1002 of the present exemplary embodiment.

Fourth Exemplary Embodiment

Description of Configuration

Next, a fourth exemplary embodiment of the present invention will be described with reference to the drawings. A moving image coding device 1003 (not shown) of the present exemplary embodiment is different from the moving image coding device 1001 shown in FIG. 1 in that a predictive coding information determination unit 2702 is included instead of the predictive coding information determination unit 2700. In addition to the functions in the third exemplary embodiment, the moving image coding device 1003 of the present exemplary embodiment can select a CB size.

Each of the CTBs described above is hierarchically divided into blocks called CBs using quadtree segmentation. According to the H.265 standard, a CB size is either 8×8 pixels, 16×16 pixels, 32×32 pixels, or 64×64 pixels. An encoder can optionally determine, in the range specified by the standard, the CB size to be used when dividing a CTB into CBs. It is known that a compression efficiency is improved by using an appropriate CB size in accordance with a complexity of a design displayed by an image.

Figure 14:
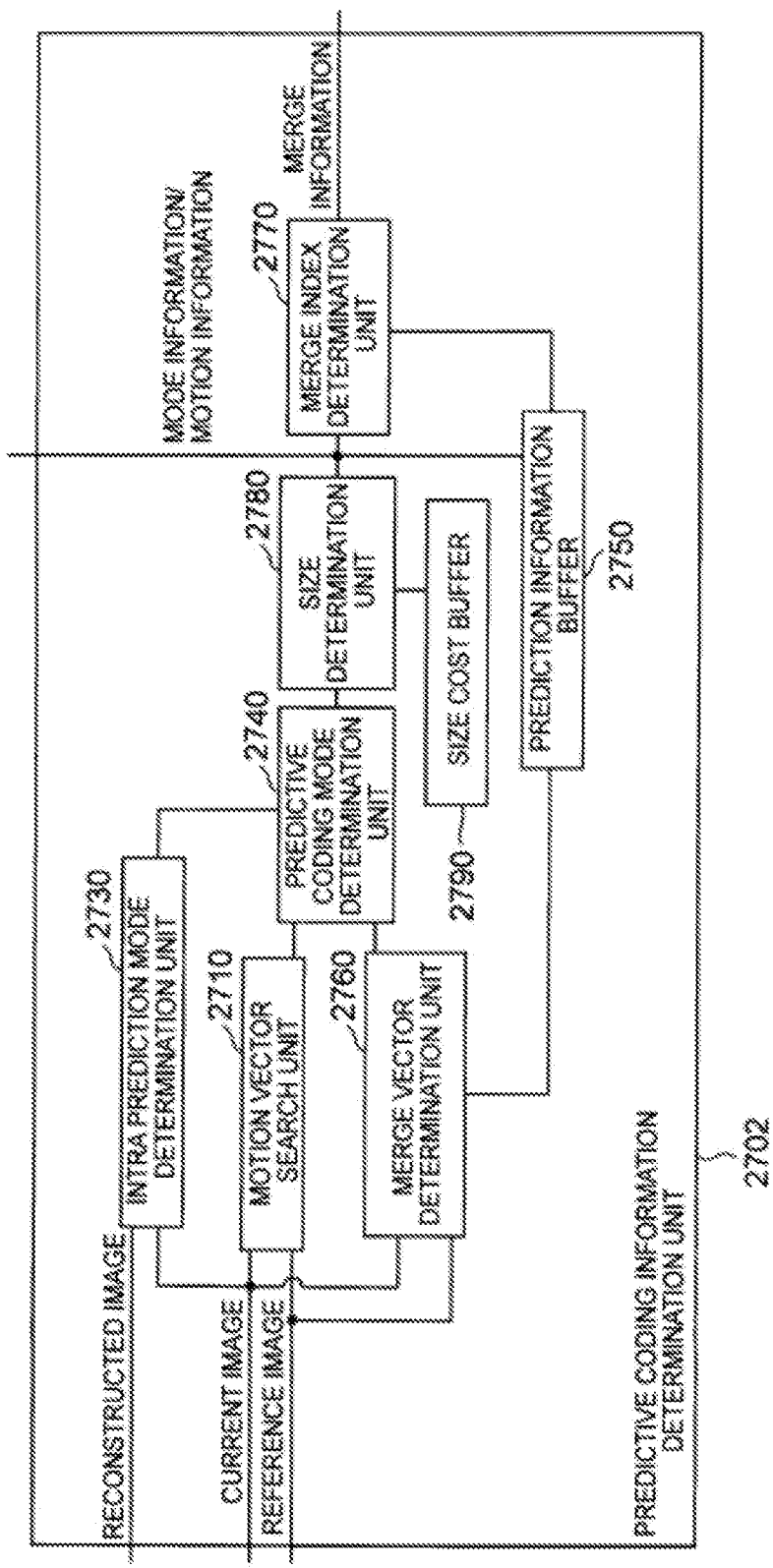
FIG. 14 is a block diagram showing a configuration example in a fourth exemplary embodiment of a predictive coding information determination unit 2702.

A configuration of the predictive coding information determination unit 2702 in the moving image coding device 1003 of the present exemplary embodiment is shown in FIG. 14. FIG. 14 is a block diagram showing a configuration example in the fourth exemplary embodiment of the predictive coding information determination unit 2702.

As shown in FIG. 14, the predictive coding information determination unit 2702 of the present exemplary embodiment is different from the predictive coding information determination unit 2701 shown in FIG. 7 in that a size determination unit 2780 and a size cost buffer 2790 are additionally included.

The configuration of the predictive coding information determination unit 2702 shown in FIG. 14, other than the size determination unit 2780 and the size cost buffer 2790, is similar to the configuration of the predictive coding information determination unit 2701 shown in FIG. 7. The predictive coding information determination unit 2702 of the present exemplary embodiment employs a general technology for determining a CB size.

The size determination unit 2780 has a function of selecting a CB size. Furthermore, the size cost buffer 2790 has a function of storing a cost for a provisional best size.

Specifically, the size determination unit 2780 compares a cost for a target CB output from a predictive coding mode determination unit 2740 with a total of costs for four sub-CBs generated when the target CB stored in the size cost buffer 2790 is divided into four.

The size determination unit 2780 selects the CB size with the smaller cost on the basis of a result of the comparison. Next, the size determination unit 2780 stores the cost for the selected CB size in the size cost buffer 2790. Furthermore, the size determination unit 2780 updates predictive coding information stored in a prediction information buffer 2750 with information of the CB size with the smaller cost.

Description of Operation

Figure 15:
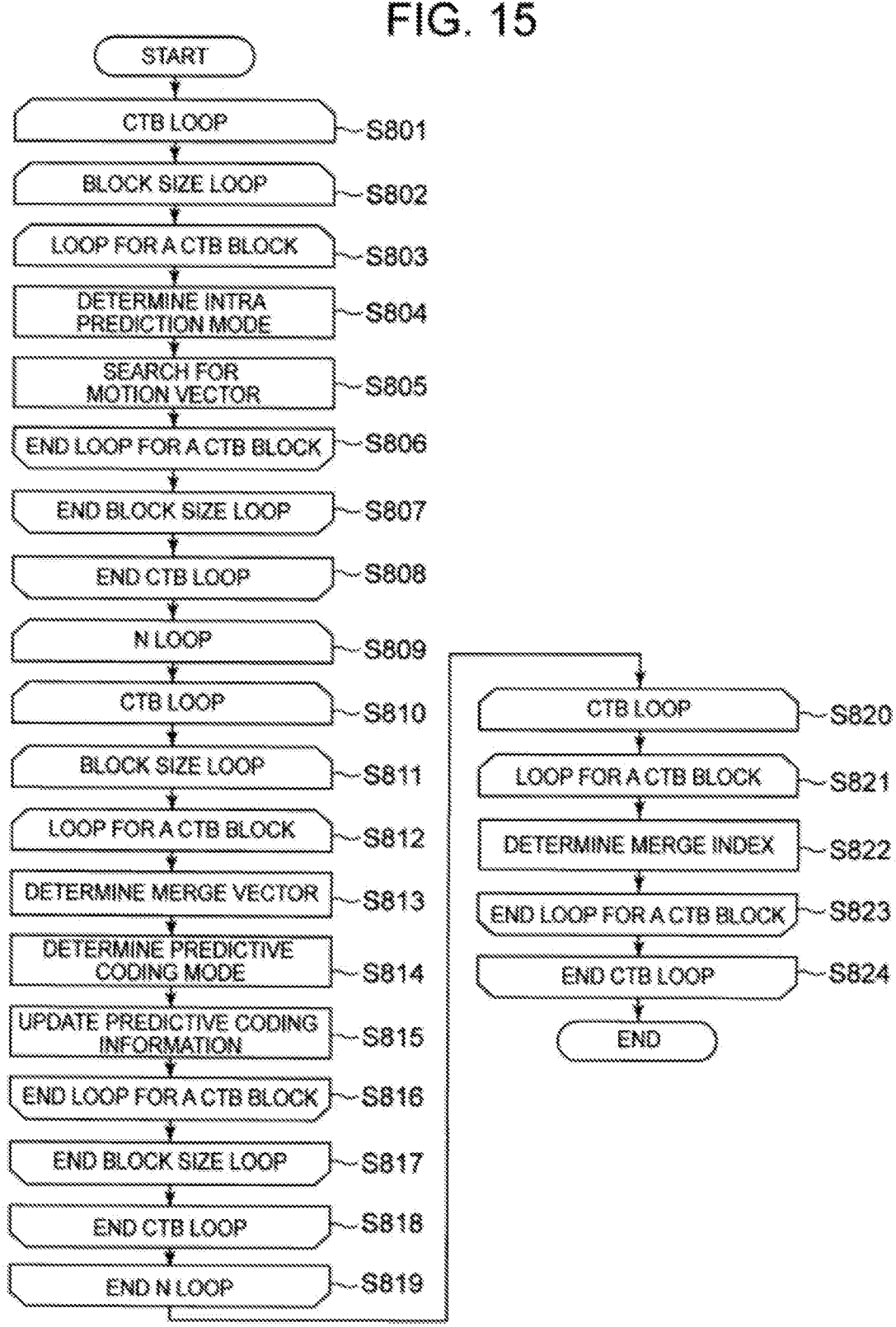
FIG. 15 is a flowchart showing an operation of predictive coding mode determination processing by the predictive coding information determination unit 2702 of the fourth exemplary embodiment.

An operation of the predictive coding information determination unit 2702 of the present exemplary embodiment will be described below with reference to FIG. 15. FIG. 15 is a flowchart showing an operation of predictive coding mode determination processing by the predictive coding information determination unit 2702 of the fourth exemplary embodiment.

In an operation example shown in FIG. 15, processing for selecting a block size optimal for coding and processing for updating the block size optimal for coding are added to the operation example shown in FIG. 13.

The predictive coding information determination unit 2702 receives an input of one CTB that has not yet been processed among CTBs constituting an input image. That is, the predictive coding information determination unit 2702 enters a CTB loop (step S801).

The predictive coding information determination unit 2702 selects, from block sizes in the input CTB, one block size for which an intra prediction mode and a provisional motion vector have not yet been determined. For example, the predictive coding information determination unit 2702 sequentially selects, from 8×8 pixels, 16×16 pixels, 32×32 pixels, or 64×64 pixels, the block size to be processed. That is, the predictive coding information determination unit 2702 enters a block size loop (step S802).

The predictive coding information determination unit 2702 selects, from blocks of the block size selected in step S802 in the input CTB, one block for which an intra prediction mode and a provisional motion vector have not yet been determined. That is, the predictive coding information determination unit 2702 enters a loop for a CTB block (step S803).

Processing of steps S804 and S805 is similar to the processing of steps S403 and S404 shown in FIG. 10.

The predictive coding information determination unit 2702 repeats the processing of steps S804 and S805 as long as the blocks of the selected block size in the input CTB include a block for which an intra prediction mode and a provisional motion vector have not been determined. When an intra prediction mode and a provisional motion vector have been determined for every block of the selected block size in the input CTB, the predictive coding information determination unit 2702 exits the loop for a CTB block (step S806).

Furthermore, the predictive coding information determination unit 2702 repeats the processing of steps S803 to S806 as long as the input CTB includes a block size for which an intra prediction mode and a provisional motion vector have not been determined. When an intra prediction mode and a provisional motion vector have been determined for every block size, the predictive coding information determination unit 2702 exits the block size loop (step S807).

Furthermore, the predictive coding information determination unit 2702 repeats the processing of steps S802 to S807 as long as the CTBs constituting the input image include a CTB that has not been processed. When all the CTBs constituting the input image have been processed, the predictive coding information determination unit 2702 exits the CTB loop (step S808).

Next, the predictive coding information determination unit 2702 enters an N loop (step S809). N is an integer equal to or larger than 1. Furthermore, the number of loops performed by the predictive coding information determination unit 2702 in an N loop is expressed by n.

Next, the predictive coding information determination unit 2702 receives an input of one CTB that has not yet been processed among the CTBs constituting the input image. That is, the predictive coding information determination unit 2702 enters a CTB loop (step S810).

Furthermore, the predictive coding information determination unit 2702 selects, from block sizes in the input CTB, one block size for which a merge vector and a predictive coding mode have not yet been determined. For example, the predictive coding information determination unit 2702 sequentially selects, from 8×8 pixels, 16×16 pixels, 32×32 pixels, or 64×64 pixels, the block size to be processed. That is, the predictive coding information determination unit 2702 enters a block size loop (step S811).

Furthermore, the predictive coding information determination unit 2702 selects, from blocks in the input CTB, one block for which a merge vector and a predictive coding mode have not yet been determined. That is, the predictive coding information determination unit 2702 enters a loop for a CTB block (step S812).

Processing of step S813 is similar to the processing of step S710 shown in FIG. 13.

The predictive coding mode determination unit 2740 receives an input of a provisional motion vector and a cost relating to the provisional motion vector output from a motion vector search unit 2710. Furthermore, the predictive coding mode determination unit 2740 receives an input of merge information and a cost relating to the merge information output from a merge vector/merge index determination unit 2720. Furthermore, the predictive coding mode determination unit 2740 receives an input of intra mode information and a cost relating to the intra mode information output from an intra prediction mode determination unit 2730.

The predictive coding mode determination unit 2740 determines, on the basis of the input information, which prediction mode to use as a predictive coding mode for a block to be coded; a prediction vector mode in which a provisional motion vector is used, a merge mode, or an intra prediction mode (step S814). The predictive coding mode determination unit 2740 inputs a cost relating to the determined prediction mode and the determined predictive coding information to the size determination unit 2780.

In a case where the block size to be processed is 8×8 pixels, which is the smallest size, the size determination unit 2780 stores, in the size cost buffer 2790, the input cost relating to the blocks to be processed. Furthermore, the size determination unit 2780 stores the input predictive coding information in the prediction information buffer 2750.

In a case where the block size to be processed is not 8×8 pixels, which is the smallest size, the size determination unit 2780 adds up the costs relating to the blocks included in the block to be processed that are stored in the size cost buffer 2790.

For example, in a case where the block size to be processed is 16×16 pixels, the block to be processed includes four blocks of 8×8 pixels in size. The size determination unit 2780 adds up the costs relating to the four blocks of 8×8 pixels.

Next, the size determination unit 2780 compares the total of the costs with the cost relating to the block to be processed. In a case where a result of the comparison indicates that the cost relating to the block to be processed is equal to or higher than the total of the costs, the size determination unit 2780 performs processing of step S816.

In a case where a result of the comparison indicates that the cost relating to the block to be processed is smaller, the size determination unit 2780 updates the cost relating to the included blocks that is stored in the size cost buffer 2790 with the cost relating to the block to be processed.

Furthermore, the size determination unit 2780 updates, with predictive coding information relating to the block to be processed, predictive coding information relating to the included blocks that is stored in the prediction information buffer 2750 (step S815).

The predictive coding information determination unit 2702 repeats the processing of steps S813 to S815 as long as the blocks of the selected block size in the input CTB include a block for which a merge vector and a predictive coding mode have not been determined. When a merge vector and a predictive coding mode have been determined for every block of the selected block size in the input CTB, the predictive coding information determination unit 2702 exits the loop for a CTB block (step S816).

Furthermore, the predictive coding information determination unit 2702 repeats the processing of steps S812 to S816 as long as the input CTB includes a block size for which a merge vector and a predictive coding mode have not been determined. When a merge vector and a predictive coding mode have been determined for every block size, the predictive coding information determination unit 2702 exits the block size loop (step S817).

Furthermore, the predictive coding information determination unit 2702 repeats the processing of steps S811 to S817 as long as the CTBs constituting the input image include a CTB that has not been processed. When all the CTBs constituting the input image have been processed, the predictive coding information determination unit 2702 exits the CTB loop (step S818), and adds 1 to n.

The predictive coding information determination unit 2702 repeats the processing of steps S810 to S818 as long as n<N. When n=N, the predictive coding information determination unit 2702 exits the N loop (step S819).

Processing of steps S820 to S824 is similar to the processing of steps S409 to S413 shown in FIG. 10.

Note that the predictive coding information determination unit 2702 may perform the pieces of processing of the CTB loops shown in FIG. 15 in parallel for each CTB.

At the end of the processing of step S818, costs relating to blocks in a CTB in a case of the CTB being divided so as to minimize the total cost have been stored in the size cost buffer 2790. Furthermore, the prediction information buffer 2750 stores predictive coding information in the case of the CTB being divided so as to minimize the total cost. That is, the moving image coding device 1003 of the present exemplary embodiment can select a block size of CBs into which a CTB is divided so as to increase the compression efficiency.

Fifth Exemplary Embodiment

Description of Configuration

Next, a fifth exemplary embodiment of the present invention will be described with reference to the drawings. A moving image coding device 1004 (not shown) of the present exemplary embodiment is different from the moving image coding device 1001 shown in FIG. 1 in that a predictive coding information determination unit 2703 is included instead of the predictive coding information determination unit 2700.

Figure 16:
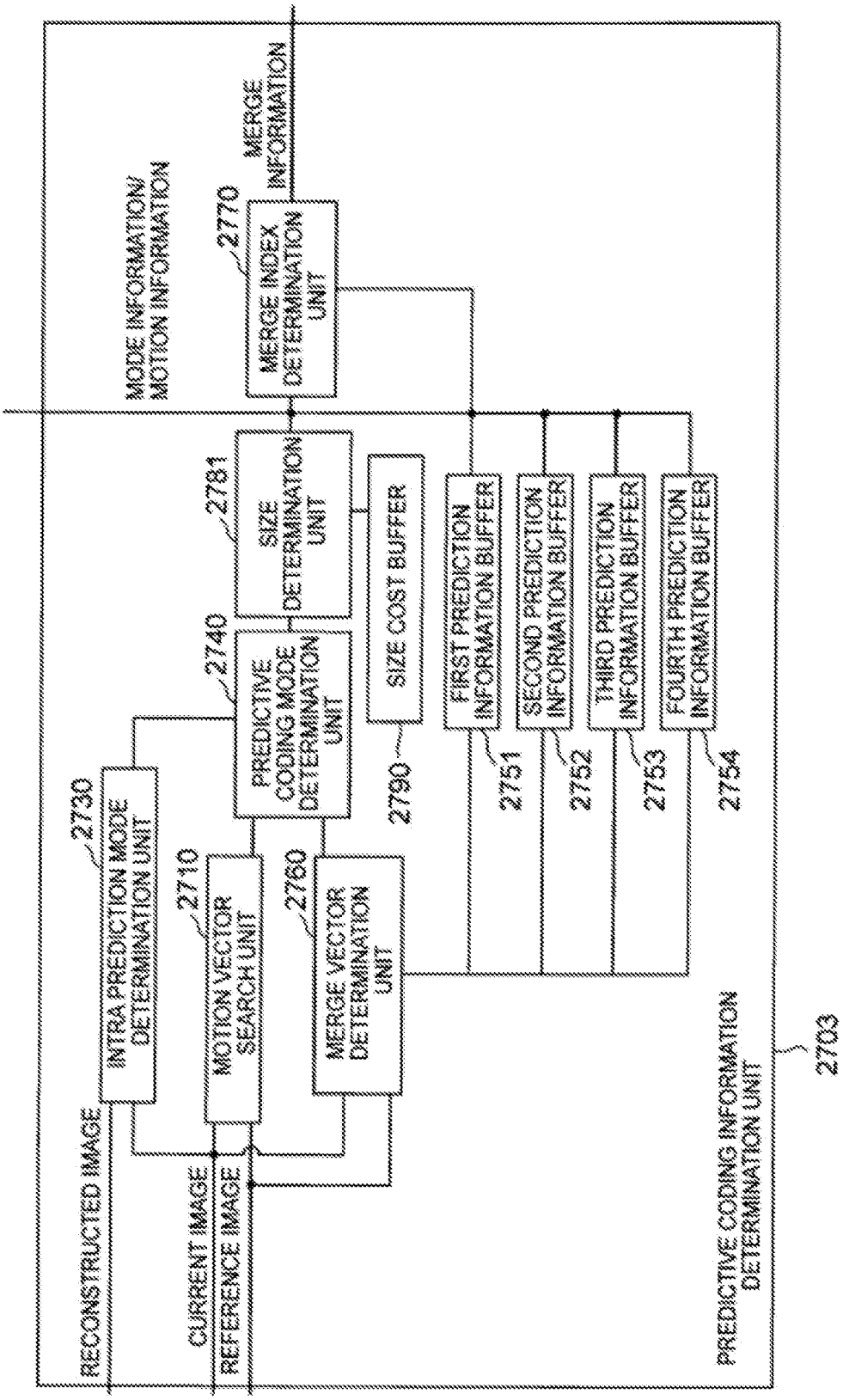
FIG. 16 is a block diagram showing a configuration example in a fifth exemplary embodiment of a predictive coding information determination unit 2703.

A configuration of the predictive coding information determination unit 2703 in the moving image coding device 1004 of the present exemplary embodiment is shown in FIG. 16. FIG. 16 is a block diagram showing a configuration example in the fifth exemplary embodiment of the predictive coding information determination unit 2703.

As shown in FIG. 16, the predictive coding information determination unit 2703 of the present exemplary embodiment is different from the predictive coding information determination unit 2702 shown in FIG. 14 in that a first prediction information buffer 2751, a second prediction information buffer 2752, a third prediction information buffer 2753, and a fourth prediction information buffer 2754 are additionally included. Furthermore, the predictive coding information determination unit 2703 includes a size determination unit 2781 instead of the size determination unit 2780.

The moving image coding device 1004 of the present exemplary embodiment can accurately perform merge index determination processing because motion information of a neighboring block referenced in merge index determination processing is equal to motion information of a neighboring block referenced in merge vector determination processing. That is, the moving image coding device 1004 can further improve the compression efficiency.

In the moving image coding device 1003 of the fourth exemplary embodiment, the size determination unit 2780 stores, in the prediction information buffer 2750, predictive coding information that is a processing result. Specifically, the size determination unit 2780 compares the costs in order from the smallest block size to the largest block size.

In a case where a cost relating to a larger CB is smaller than a total of costs relating to smaller CBs, the size determination unit 2780 overwrites predictive coding information relating to the smaller CBs that is stored in the prediction information buffer 2750 with predictive coding information relating to the larger CB.

However, in a case where a larger CB is selected in a certain image region in a CTB in the N loop iterative processing shown in FIG. 15, the prediction information buffer 2750 holds only predictive coding information relating to the larger CB for the certain image region.

Thus, even in a case where a neighboring block referenced in merge index determination processing is a smaller CB included in a larger CB, the prediction information buffer 2750 holds only predictive coding information relating to the larger CB. Thus, the merge index determination unit 2770 cannot reference motion information of the neighboring block.

In particular, a merge index selection unit 2772 can reference only information that is different from predictive coding information relating to a neighboring block to be referenced in merge index selection processing. In a case where only different information can be referenced, the compression efficiency reduces.

In order to solve the problem described above, the predictive coding information determination unit 2703 of the present exemplary embodiment includes a plurality of prediction information buffers. The number of prediction information buffers included in the predictive coding information determination unit 2703 is equal to the number of types of CB sizes.

Specifically, since there are four types of CB sizes: 64×64 pixels, 32×32 pixels, 16×16 pixels, and 8×8 pixels, the predictive coding information determination unit 2703 includes four prediction information buffers. Each prediction information buffer holds predictive coding information relating to CBs of a size equal to or smaller than the corresponding size.

That is, the first prediction information buffer 2751 holds predictive coding information relating to CBs of 64×64 pixels or smaller. Furthermore, the second prediction information buffer 2752 holds predictive coding information relating to CBs of 32×32 pixels or smaller. Furthermore, the third prediction information buffer 2753 holds predictive coding information relating to CBs of 16×16 pixels or smaller. Furthermore, the fourth prediction information buffer 2754 holds predictive coding information relating to CBs of 8×8 pixels.

A merge vector candidate list generation unit 2771 acquires predictive coding information relating to a neighboring block from a prediction information buffer corresponding to the size and position of a block to be processed.

For example, in a case where the block to be processed and the neighboring block to be referenced are in the same CB of 16×16 pixels, the merge vector candidate list generation unit 2771 acquires, from the fourth prediction information buffer 2754, predictive coding information (motion information) relating to the neighboring block.

Furthermore, in a case where the block to be processed and the neighboring block to be referenced are not in the same CB of 16×16 pixels but in the same CB of 32×32 pixels, the merge vector candidate list generation unit 2771 acquires, from the third prediction information buffer 2753, predictive coding information (motion information) relating to the neighboring block.

Furthermore, in a case where the block to be processed and the neighboring block to be referenced are not in the same CB of 32×32 pixels but in the same CB of 64×64 pixels, the merge vector candidate list generation unit 2771 acquires, from the second prediction information buffer 2752, predictive coding information (motion information) relating to the neighboring block.

Furthermore, in a case where the block to be processed and the neighboring block to be referenced are not in the same CB of 64×64 pixels, either, the merge vector candidate list generation unit 2771 acquires, from the first prediction information buffer 2751, predictive coding information (motion information) relating to the neighboring block.

Moreover, in a case where the size of the block to be processed is 64×64 pixels, the size determination unit 2781 of the present exemplary embodiment updates the information held in the first prediction information buffer 2751.

In a case where the size of the block to be processed is 32×32 pixels, the size determination unit 2781 updates the information held in the first prediction information buffer 2751 and the information held in the second prediction information buffer 2752.

Furthermore, in a case where the size of the block to be processed is 16×16 pixels, the size determination unit 2781 updates the information held in the first prediction information buffer 2751, the information held in the second prediction information buffer 2752, and the information held in the third prediction information buffer 2753.

In a case where the size of the block to be processed is 8×8 pixels, the size determination unit 2781 updates all the information held in the first to fourth prediction information buffers 2751 to 2754.

That is, as described above, the fourth prediction information buffer 2754 stores predictive coding information as determination results relating to blocks of 8×8 pixels in size. Furthermore, the third prediction information buffer 2753 stores predictive coding information as determination results relating to blocks of 16×16 pixels or smaller in size.

Furthermore, the second prediction information buffer 2752 stores predictive coding information as determination results relating to blocks of 32×32 pixels or smaller in size. Furthermore, the first prediction information buffer 2751 stores predictive coding information as determination results relating to blocks of 64×64 pixels or smaller in size.

Consequently, in the present exemplary embodiment, motion information relating to a smaller CB constituting a neighboring block that is held in a buffer is not overwritten with motion information relating to a larger CB. The merge index determination unit 2770 references, for example, motion information relating to CBs of all sizes stored in the first prediction information buffer 2751 to determine a merge index.

Description of Operation

An operation of the predictive coding information determination unit 2703 of the present exemplary embodiment is substantially similar to the operation of predictive coding mode determination processing shown in FIG. 15.

However, the processing of step S815 is different from the processing of step S815 in the fourth exemplary embodiment. In a case where the selected block size is 8×8 pixels, the size determination unit 2781 stores the predictive coding information relating to the block to be processed in all prediction information buffers.

Furthermore, in a case where the selected block size is 16×16 pixels, the size determination unit 2781 updates, with the predictive coding information relating to the block to be processed, each of the information held in the first prediction information buffer 2751, the information held in the second prediction information buffer 2752, and the information held in the third prediction information buffer 2753.

Furthermore, in a case where the selected block size is 32×32 pixels, the size determination unit 2781 updates, with the predictive coding information relating to the block to be processed, each of the information held in the first prediction information buffer 2751 and the information held in the second prediction information buffer 2752.

Furthermore, in a case where the selected block size is 64×64 pixels, the size determination unit 2781 updates, with the predictive coding information relating to the block to be processed, the information held in the first prediction information buffer 2751.

In the present exemplary embodiment, the predictive coding information relating to the neighboring block referenced in the merge index determination processing is equal to the predictive coding information relating to the neighboring block referenced in the merge vector determination processing. This improves the accuracy of the merge index determination processing. That is, the moving image coding device 1004 can further improve the compression efficiency.

In each of the exemplary embodiments described above, processing in which a merge vector candidate list generation unit references information of a neighboring block has been described. As in the merge vector candidate list generation unit, a motion vector search unit may also (that is, also in AMVP) reference information of a neighboring block.

Furthermore, in each of the exemplary embodiments described above, when generating a list, the merge vector candidate list generation unit can reference only blocks in a CTB to which the block to be processed belongs, but regions that can be referenced by the merge vector candidate list generation unit are not limited to CTBs. Regions that can be referenced by the merge vector candidate list generation unit are only required to be regions to which a block to be processed belongs, and may be regions larger than CTBs or smaller than CTBs.

Furthermore, each of the exemplary embodiments described above, which may be realized by using hardware, may also be realized by using, for example, a computer program recorded on a recording medium.

Figure 17:
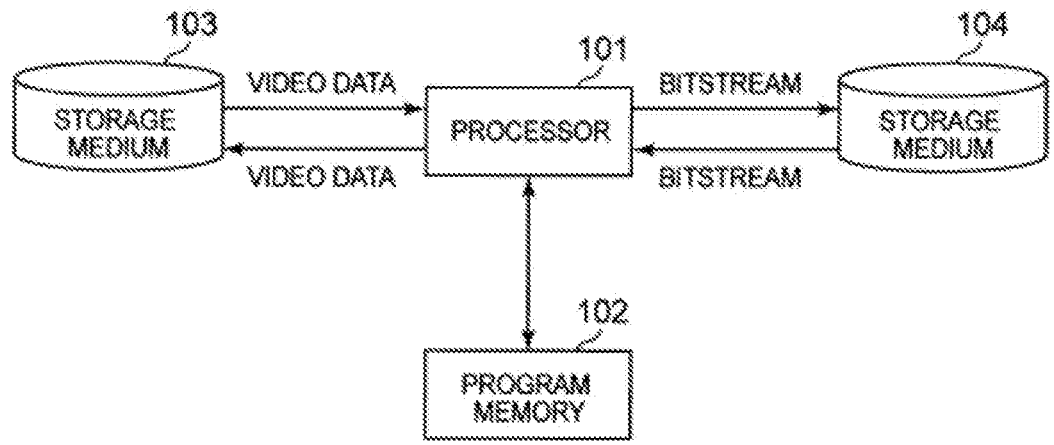
FIG. 17 is a block diagram showing a configuration example of an information processor that can implement functions of a moving image coding device according to the present invention.

FIG. 17 shows an information processor that includes a processor 101, a program memory 102, a storage medium (recording medium) 103 for storing video data, and a storage medium 104 for storing data such as a bitstream. The storage medium 103 and the storage medium 104 may be separate storage media, or may be storage areas constituted by the same storage medium. Magnetic storage media such as hard disks can be used as the storage media. In the storage medium 103, at least the area in which a program is stored is a non-transitory tangible storage area (non-transitory tangible medium).

In the information processor shown in FIG. 17, the program memory 102 stores, for example, a program for implementing the function of each block shown in FIG. 1. In accordance with the program stored in the program memory 102, the processor 101 performs processing, thereby implementing the function of the moving image coding device 1001 shown in FIG. 1, for example.

Figure 18:
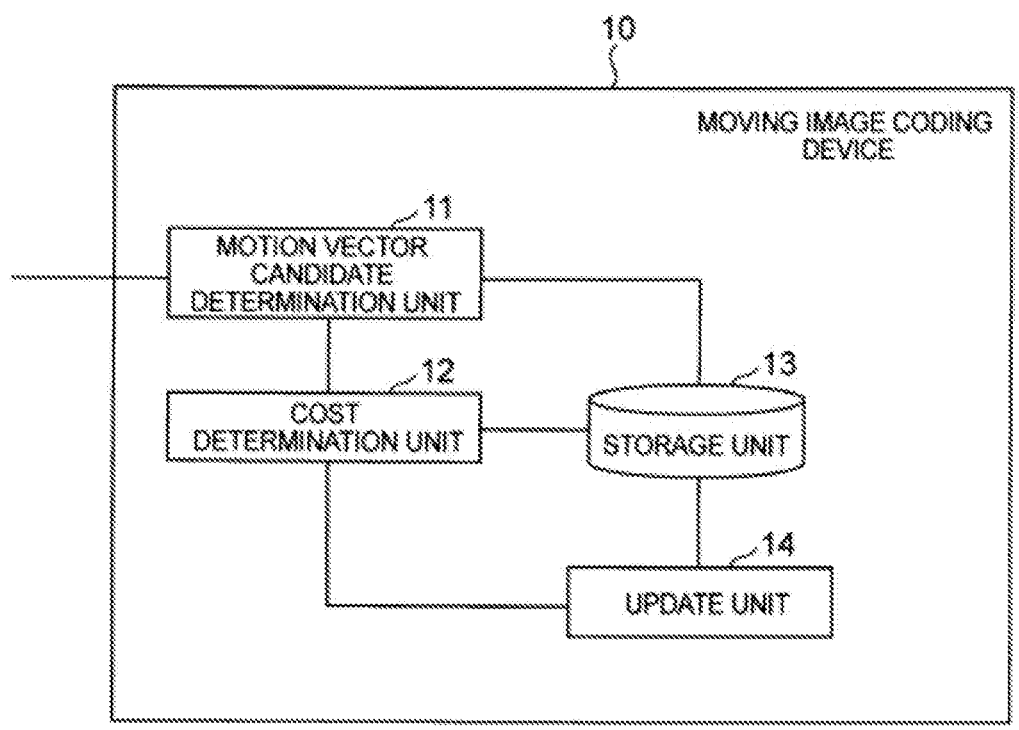
FIG. 18 is a block diagram showing an outline of a moving image coding device according to the present invention.

Next, an outline of the present invention will be described. FIG. 18 is a block diagram showing an outline of a moving image coding device according to the present invention. A moving image coding device 10 according to the present invention includes: a motion vector candidate determination unit 11 (for example, the predictive coding information determination unit 2702) that determines, on the basis of a motion vector of an adjacent block, among adjacent blocks that are adjacent to a block to be coded included in a reference region in an image, included in the reference region, candidates for a motion vector of the block to be coded to be used for motion-compensated prediction; a cost determination unit 12 (for example, the size determination unit 2780) that determines, as a cost relating to a block to be coded, a minimum cost among appraisal costs relating to determined candidates for a motion vector; a storage unit 13 (for example, the prediction information buffer 2750) that stores, as coding information relating to the block to be coded, a candidate for the motion vector corresponding to the determined cost; and an update unit 14 (for example, the size determination unit 2780) that updates, to coding information relating to the block to be coded, the cost of which is smaller than the sum total of costs relating to blocks included in the block to be coded, the coding information relating to the included blocks and stored in the storage unit 13.

With such a configuration, the moving image coding device can process many tasks in parallel without a reduction in coding efficiency.

Furthermore, the motion vector candidate determination unit 11 may include a list generation unit (for example, the merge vector candidate list generation unit 2761) that generates a merge vector candidate list relating to the block to be coded on the basis of motion vectors of the adjacent blocks included in the reference region in which the block to be coded is included, and a merge vector selection unit (for example, the merge vector selection unit 2762) that selects, from the generated merge vector candidate list, a merge vector candidate with a minimum appraisal cost as a motion vector candidate.

With such a configuration, the moving image coding device can perform, in parallel for each CTB, merge vector candidate list generation processing in a merge mode and merge vector selection processing used for motion-compensated prediction.

Furthermore, the motion vector candidate determination unit 11 may include a predictive motion vector search unit (for example, the motion vector search unit 2710) that searches for a predictive motion vector that is relating to the block to be coded and serves as a motion vector candidate, on the basis of the motion vectors of the adjacent blocks included in the reference region in which the block to be coded is included.

With such a configuration, the moving image coding device can perform, in parallel for each CTB, predictive motion vector search processing in AMVP.

Furthermore, the moving image coding device 10 may include a second list generation unit (for example, the merge vector candidate list generation unit 2771) that generates a merge vector candidate list relating to the block to be coded on the basis of the motion vectors of the adjacent blocks of the block to be coded after a predictive coding mode and a motion vector have been determined for every block in the image, and an index generation unit (for example, the merge index selection unit 2772) that generates an index corresponding to the generated merge vector candidate list.

With such a configuration, the moving image coding device can achieve both parallel execution for each CTB of merge vector candidate list generation processing and merge vector selection processing, and generation of a merge index compliant with the H.265 standard.

Furthermore, the storage unit 13 may include a first storage unit (for example, the first prediction information buffer 2751) that stores coding information relating to all blocks to be coded, and a second storage unit (for example, the second prediction information buffer 2752, the third prediction information buffer 2753, and the fourth prediction information buffer 2754) that stores coding information relating to blocks to be coded that are equal to or smaller than a predetermined block size, and the update unit 14 may update coding information relating to the included blocks stored in the first storage unit to coding information relating to a block to be coded that is larger than the predetermined block size and has a cost smaller than the sum total of costs relating to the included blocks.

With such a configuration, the moving image coding device can also store all predictive coding information relating to smaller CBs.

Furthermore, the second list generation unit may determine, in accordance with a block size of a block to be coded, from which of the first storage unit or the second storage unit motion vectors of adjacent blocks of the block to be coded are to be acquired.

With such a configuration, the moving image coding device can perform merge index determination processing more accurately.

While the present invention has been described above with reference to the exemplary embodiments and examples, the present invention is not limited to the above-described exemplary embodiments and examples. Various changes that can be understood by those skilled in the art can be made to the configuration and details of the present invention within the scope of the present invention.

This application claims priority based on Japanese Patent Application No. 2017-185990 filed on Sep. 27, 2017, the entire disclosure of which is incorporated herein.

INDUSTRIAL APPLICABILITY

The present invention can provide a high degree of parallelism in processing while maintaining the coding efficiency in coding processing, and can perform high-speed processing of a high-resolution video, and therefore can be suitably applied to imaging systems, transcoding systems, and the like that require high-resolution processing.

REFERENCE SIGNS LIST 10, 1000, 1001, 1002, 1003, 1004 Moving image coding device
11 Motion vector candidate determination unit
12 Cost determination unit
13 Storage unit
14 Update unit
101 Processor
102 Program memory
103, 104 Storage medium
1100 Transform/quantization unit
1200 Subtraction unit
1210 Addition unit
1300 Coding unit
1400 Inverse transform/inverse quantization unit
1500 Loop filter
1600 Frame buffer
1700, 2700, 2701, 2702, 2703 Predictive coding information determination unit
1710, 2710 Motion vector search unit
1720, 2720 Merge vector/merge index determination unit
1721, 2721, 2761, 2771 Merge vector candidate list generation unit
1722, 2722 Merge vector/index selection unit
1730, 2730 Intra prediction mode determination unit
1740, 2740 Predictive coding mode determination unit
1750, 2750 Prediction information buffer
2751 First prediction information buffer
2752 Second prediction information buffer
2753 Third prediction information buffer
2754 Fourth prediction information buffer
1800 Intra prediction unit
1900 Motion-compensated prediction unit
2760 Merge vector determination unit
2762 Merge vector selection unit
2770 Merge index determination unit
2772 Merge index selection unit
2780, 2781 Size determination unit
2790 Size cost buffer

What is claimed is:

1. A moving image coding device comprising:
a motion vector candidate determination unit, implemented by a processor, which determines, on the basis of a motion vector of an adjacent block, among adjacent blocks that are adjacent to a block to be coded included in a reference region in an image, included in the reference region, candidates for a motion vector of the block to be coded to be used for motion-compensated prediction;
a cost determination unit, implemented by the processor, which determines, as a cost relating to a block to be coded, a minimum cost among appraisal costs relating to determined candidates for a motion vector;
a storage unit which stores, as coding information relating to the block to be coded, a candidate for the motion vector corresponding to the determined cost; and
an update unit, implemented by the processor, which updates, to coding information relating to the block to be coded, the cost of which is smaller than the sum total of costs relating to blocks included in the block to be coded, the coding information relating to the included blocks and stored in the storage unit;
a second list generation unit, implemented by the processor, which generates a merge vector candidate list relating to the block to be coded on the basis of the motion vectors of the adjacent blocks of the block to be coded after a predictive coding mode and a motion vector have been determined for every block in the image; and
an index generation unit, implemented by the processor, which generates an index corresponding to the generated merge vector candidate list.

2. The moving image coding device according to claim 1, wherein
the storage unit comprises a first storage unit which stores coding information relating to all blocks to be coded, and a second storage unit which stores coding information relating to blocks to be coded that are equal to or smaller than a predetermined block size, and
the update unit updates coding information relating to the included blocks stored in the first storage unit to coding information relating to a block to be coded that is larger than the predetermined block size and has a cost smaller than the sum total of costs relating to the included blocks.

3. The moving image coding device according to claim 2, wherein
the second list generation unit determines, in accordance with a block size of a block to be coded, from which of the first storage unit or the second storage unit motion vectors of adjacent blocks of the block to be coded are to be acquired.

4. The moving image coding device according to claim 1, wherein
the motion vector candidate determination unit comprises a list generation unit which generates a merge vector candidate list relating to the block to be coded on the basis of motion vectors of the adjacent blocks included in the reference region in which the block to be coded is included, and a merge vector selection unit which selects, from the generated merge vector candidate list, a merge vector candidate with a minimum appraisal cost as a motion vector candidate.

5. The moving image coding device according to claim 4, wherein
the motion vector candidate determination unit further comprises a predictive motion vector search unit which searches for a predictive motion vector that is relating to the block to be coded and serves as a motion vector candidate, on the basis of the motion vectors of the adjacent blocks included in the reference region in which the block to be coded is included.

6. The moving image coding device according to claim 5, wherein
the storage unit comprises a first storage unit which stores coding information relating to all blocks to be coded, and a second storage unit which stores coding information relating to blocks to be coded that are equal to or smaller than a predetermined block size, and the update unit updates coding information relating to the included blocks stored in the first storage unit to coding information relating to a block to be coded that is larger than the predetermined block size and has a cost smaller than the sum total of costs relating to the included blocks.

7. The moving image coding device according to claim 6, wherein
the second list generation unit determines, in accordance with a block size of a block to be coded, from which of the first storage unit or the second storage unit motion vectors of adjacent blocks of the block to be coded are to be acquired.

8. The moving image coding device according to claim 4, wherein
the storage unit comprises a first storage unit which stores coding information relating to all blocks to be coded, and a second storage unit which stores coding information relating to blocks to be coded that are equal to or smaller than a predetermined block size, and
the update unit updates coding information relating to the included blocks stored in the first storage unit to coding information relating to a block to be coded that is larger than the predetermined block size and has a cost smaller than the sum total of costs relating to the included blocks.

9. The moving image coding device according to claim 8, wherein
the second list generation unit determines, in accordance with a block size of a block to be coded, from which of the first storage unit or the second storage unit motion vectors of adjacent blocks of the block to be coded are to be acquired.

10. The moving image coding device according to claim 1, wherein
the motion vector candidate determination unit further comprises a predictive motion vector search unit which searches for a predictive motion vector that is relating to the block to be coded and serves as a motion vector candidate, on the basis of the motion vectors of the adjacent blocks included in the reference region in which the block to be coded is included.

11. The moving image coding device according to claim 10, wherein
the storage unit comprises a first storage unit which stores coding information relating to all blocks to be coded, and a second storage unit which stores coding information relating to blocks to be coded that are equal to or smaller than a predetermined block size, and
the update unit updates coding information relating to the included blocks stored in the first storage unit to coding information relating to a block to be coded that is larger than the predetermined block size and has a cost smaller than the sum total of costs relating to the included blocks.

12. The moving image coding device according to claim 11, wherein
the second list generation unit determines, in accordance with a block size of a block to be coded, from which of the first storage unit or the second storage unit motion vectors of adjacent blocks of the block to be coded are to be acquired.

13. A moving image coding method comprising:
determining, on the basis of a motion vector of an adjacent block, among adjacent blocks that are adjacent to a block to be coded included in a reference region in an image, included in the reference region, candidates for a motion vector of the block to be coded to be used for motion-compensated prediction;
determining, as a cost relating to a block to be coded, a minimum cost among appraisal costs relating to determined candidates for a motion vector;
storing, as coding information relating to the block to be coded, a candidate for the motion vector corresponding to the determined cost;
updating, to coding information relating to the block to be coded, the cost of which is smaller than the sum total of costs relating to blocks included in the block to be coded, stored coding information relating to the included blocks;
generating a merge vector candidate list relating to the block to be coded on the basis of the motion vectors of the adjacent blocks of the block to be coded after a predictive coding mode and a motion vector have been determined for every block in the image; and
generating an index corresponding to the generated merge vector candidate list.

14. The moving image coding method according to claim 13, further comprising:
generating a merge vector candidate list relating to the block to be coded on the basis of motion vectors of the adjacent blocks included in the reference region in which the block to be coded is included; and
selecting, from the generated merge vector candidate list, a merge vector candidate with a minimum appraisal cost as a motion vector candidate.

15. A non-transitory computer-readable capturing medium having captured therein a moving image coding program for causing a computer to perform:
a first determination processing of determining, on the basis of a motion vector of an adjacent block, among adjacent blocks that are adjacent to a block to be coded included in a reference region in an image, included in the reference region, candidates for a motion vector of the block to be coded to be used for motion-compensated prediction;
a second determination processing of determining, as a cost relating to a block to be coded, a minimum cost among appraisal costs relating to determined candidates for a motion vector;
a storage processing of storing, as coding information relating to the block to be coded, a candidate for the motion vector corresponding to the determined cost;
an update processing of updating, to coding information relating to the block to be coded, the cost of which is smaller than the sum total of costs relating to blocks included in the block to be coded, stored coding information relating to the included blocks;
a first generation processing of generating a merge vector candidate list relating to the block to be coded on the basis of the motion vectors of the adjacent blocks of the block to be coded after a predictive coding mode and a motion vector have been determined for every block in the image; and
a second generation processing of generating an index corresponding to the generated merge vector candidate list.

16. The moving image coding program according to claim 15, further causing the computer to perform:
a third generation processing of generating a merge vector candidate list relating to the block to be coded on the basis of motion vectors of the adjacent blocks included in the reference region in which the block to be coded is included; and a selection processing of selecting, from the generated merge vector candidate list, a merge vector candidate with a minimum appraisal cost as a motion vector candidate.

* * * * *